(12) United States Patent
Kobayashi et al.

(10) Patent No.: US 12,273,069 B2
(45) Date of Patent: Apr. 8, 2025

(54) ABNORMALITY DETERMINATION SYSTEM FOR PHOTOVOLTAIC MODULE AND ABNORMALITY DETERMINATION METHOD FOR PHOTOVOLTAIC MODULE

(71) Applicant: Teikyo University, Tokyo (JP)

(72) Inventors: Yasuyuki Kobayashi, Tochigi (JP); Naoto Ugajin, Tochigi (JP)

(73) Assignee: Teikyo University, Tokyo (JP)

( * ) Notice: Subject to any disclaimer, the term of this patent is extended or adjusted under 35 U.S.C. 154(b) by 68 days.

(21) Appl. No.: 18/257,138

(22) PCT Filed: Dec. 7, 2021

(86) PCT No.: PCT/JP2021/044924
§ 371 (c)(1),
(2) Date: Jun. 13, 2023

(87) PCT Pub. No.: WO2022/138137
PCT Pub. Date: Jun. 30, 2022

(65) Prior Publication Data
US 2024/0030869 A1    Jan. 25, 2024

(30) Foreign Application Priority Data

Dec. 25, 2020  (JP) .................................. 2020-216691

(51) Int. Cl.
*H02S 50/15*  (2014.01)
(52) U.S. Cl.
CPC ................................... *H02S 50/15* (2014.12)
(58) Field of Classification Search
CPC ........... H02S 50/15; H02S 50/10; Y02E 10/50
See application file for complete search history.

(56) References Cited

U.S. PATENT DOCUMENTS

2013/0311121 A1* 11/2013 Kohno ................... G01R 31/40
                                                        702/64
2016/0322934 A1* 11/2016 Nos Aguila ........ G01N 21/6489
2022/0038053 A1    2/2022 Kobayashi

FOREIGN PATENT DOCUMENTS

CN       102338847 B  * 10/2013
CN       105954616 A     9/2016
(Continued)

OTHER PUBLICATIONS

English translation of CN-102338847-B (Year: 2013).*
International Search Report for corresponding PCT application No. PCT/JP2021/044924, dated Jan. 25, 2022.

*Primary Examiner* — Thang X Le
*Assistant Examiner* — Haidong Zhang
(74) *Attorney, Agent, or Firm* — McDonnell Boehnen Hulbert & Berghoff LLP

(57) ABSTRACT

An abnormality determination system for a photovoltaic module determines the presence or absence of an abnormality in each of a plurality of photovoltaic cells constituting the photovoltaic module and connected in series; controls an irradiation state of incident light on a photovoltaic cell to be subjected to determination between at least a first irradiation state and a second irradiation state in which a short-circuit current of the photovoltaic cell to be subjected to determination is larger than a short-circuit current of the photovoltaic cell to be subjected to determination in the first irradiation state; irradiates the photovoltaic cell to be subjected to determination with modulated light different from the incident light; detects a minute change in an output current of the photovoltaic module in accordance with the irradiation of the photovoltaic cell to be subjected to determination with the modulated light; outputs a detection result as a phase detection unit output; calculates a ratio between a phase detection unit output in the first irradiation state and a phase (Continued)

detection unit output in the second irradiation state; and compares the ratio calculated with a threshold value set in advance.

6 Claims, 9 Drawing Sheets

(56) References Cited

FOREIGN PATENT DOCUMENTS

| | | | |
|---|---|---|---|
| JP | 6712816 | B | 6/2020 |
| WO | 2015118608 | A1 | 8/2015 |
| WO | 2020122105 | A1 | 6/2020 |

\* cited by examiner

ABNORMALITY DETERMINATION SYSTEM FOR PHOTOVOLTAIC MODULE AND ABNORMALITY DETERMINATION METHOD FOR PHOTOVOLTAIC MODULE

TECHNICAL FIELD

The present invention relates to an abnormality determination system for a photovoltaic module and an abnormality determination method for a photovoltaic module.

Priority is claimed on Japanese Patent Application No. 2020-216691, filed Dec. 25, 2020, the content of which is incorporated herein by reference.

BACKGROUND ART

In the related art, an abnormality determination system and a method for a photovoltaic module are known that can accurately determine which of a plurality of photovoltaic cells connected in series is in an abnormal state (See Patent Document 1).

In addition, in the related art, a photovoltaic cell operation voltage estimation system is known that, in a state in which one photovoltaic cell of a plurality of photovoltaic cells constituting a photovoltaic module is (partially) shielded from light, irradiates the photovoltaic cell with modulated light and detects a minute change in an output current of the photovoltaic module, and, in a state in which the photovoltaic cell is (partially) shielded from light, irradiates each of the other photovoltaic cells with modulated light and detects a minute change in the output current of the photovoltaic module (see Patent Document 2).

CITATION LIST

Patent Documents

[Patent Document 1]
  Japanese Patent No. 6712816
[Patent Document 2]
  PCT International Publication No. 2020/122105

SUMMARY OF INVENTION

Technical Problem

The inventor of the present invention considers it important that the photovoltaic cells constituting the photovoltaic module have similar parallel resistance components as a condition for effectively utilizing the technology disclosed in Patent Document 2, and considers it necessary to evaluate the parallel resistance component of each of the photovoltaic cells before measuring voltages of the photovoltaic cells based on the technology disclosed in Patent Document 2.

Accordingly, an object of the present invention is to provide an abnormality determination system for a photovoltaic module and an abnormality determination method for a photovoltaic module capable of determining the presence or absence of abnormalities in the parallel resistance components of the photovoltaic cells connected in series in the photovoltaic module.

Solution to Problem

According to one aspect of the present invention, an abnormality determination system for a photovoltaic module is provided that determines the presence or absence of an abnormality in each of a plurality of photovoltaic cells constituting a photovoltaic module and connected in series, the abnormality determination system including an irradiation state control unit configured to control an irradiation state of incident light on a photovoltaic cell to be subjected to determination between at least a first irradiation state and a second irradiation state in which a short-circuit current of the photovoltaic cell to be subjected to determination is larger than a short-circuit current of the photovoltaic cell to be subjected to determination in the first irradiation state; a modulated light irradiation unit configured to irradiate the photovoltaic cell to be subjected to determination with modulated light different from the incident light; a phase detection unit configured to detect a minute change in an output current of the photovoltaic module in accordance with the irradiation of the photovoltaic cell to be subjected to determination with the modulated light, and output a detection result as a phase detection unit output; a ratio calculation unit configured to calculate a ratio between a phase detection unit output in the first irradiation state and a phase detection unit output in the second irradiation state; and a comparison unit configured to compare the ratio calculated by the ratio calculation unit with a threshold value set in advance.

In the abnormality determination system for a photovoltaic module according to the aspect of the present invention, the first irradiation state may be a state in which control is performed to reduce the incident light applied to the photovoltaic cell to be subjected to determination, and the second irradiation state may be a state in which control to increase the incident light applied to the photovoltaic cell to be subjected to determination is performed.

In the abnormality determination system for a photovoltaic module according to the aspect of the present invention, the first irradiation state may be a state in which neither control to reduce the incident light applied to the photovoltaic cell to be subjected to determination nor control to increase the incident light applied to the photovoltaic cell to be subjected to determination is performed, and the second irradiation state may be a state in which control is performed to increase the incident light applied to the photovoltaic cell to be subjected to determination.

In the abnormality determination system for a photovoltaic module according to the aspect of the present invention, the first irradiation state may be a state in which control is performed to reduce the incident light applied to the photovoltaic cell to be subjected to determination, and the second irradiation state may be a state in which neither control to reduce the incident light applied to the photovoltaic cell to be subjected to determination nor control to increase the incident light applied to the photovoltaic cell to be subjected to determination is performed.

According to one aspect of the present invention, an abnormality determination method for a photovoltaic module is provided that determines the presence or absence of an abnormality in each of a plurality of photovoltaic cells constituting a photovoltaic module and connected in series, the abnormality determination method including an irradiation state control step of controlling an irradiation state of incident light on a photovoltaic cell to be subjected to determination between at least a first irradiation state and a second irradiation state in which a short-circuit current of the photovoltaic cell to be subjected to determination is larger than a short-circuit current of the photovoltaic cell to be subjected to determination in the first irradiation state; a modulated light irradiation step of irradiating the photovoltaic cell to be subjected to determination with modulated light different from the incident light; a phase detection step of detecting a minute change in an output current of the photovoltaic module in accordance with the irradiation of the photovoltaic cell to be subjected to determination with the modulated light, and outputting a detection result as a phase detection unit output; a ratio calculation step of calculating a ratio between a phase detection unit output in the first irradiation state and a phase detection unit output in the second irradiation state; and a comparison step of comparing the ratio calculated in the ratio calculation step with a threshold value set in advance.

In the abnormality determination method for a photovoltaic module according to the aspect of the present invention, the modulated light irradiation step may include a first irradiation state modulated light irradiation step of irradiating the photovoltaic cell to be subjected to determination with the modulated light when being controlled to the first irradiation state, and a second irradiation state modulated light irradiation step of irradiating the photovoltaic cell to be subjected to determination with the modulated light when being controlled to the second irradiation state, and the phase detection step may include a first irradiation state phase detection step of outputting a detection result of a minute change in the output current of the photovoltaic module in accordance with the irradiation of the photovoltaic cell to be subjected to determination with the modulated light when being controlled to the first irradiation state, as a phase detection unit output of the first irradiation state, and a second irradiation state phase detection step of outputting a detection result of a minute change in the output current of the photovoltaic module in accordance with the irradiation of the photovoltaic cell to be subjected to determination with the modulated light when being controlled to the second irradiation state, as a phase detection unit output of the second irradiation state.

Advantageous Effects of Invention

According to the present invention, it is possible to provide an abnormality determination system for a photovoltaic module and an abnormality determination method for a photovoltaic module capable of determining the presence or absence of abnormalities in the parallel resistance components of the photovoltaic cells connected in series in the photovoltaic module.

DESCRIPTION OF EMBODIMENTS

Before describing embodiments of an abnormality determination system for a photovoltaic module and an abnormality determination method for a photovoltaic module of the present invention, an operation principle of the abnormality determination system for a photovoltaic module of the present invention will be described.

Figure 1:
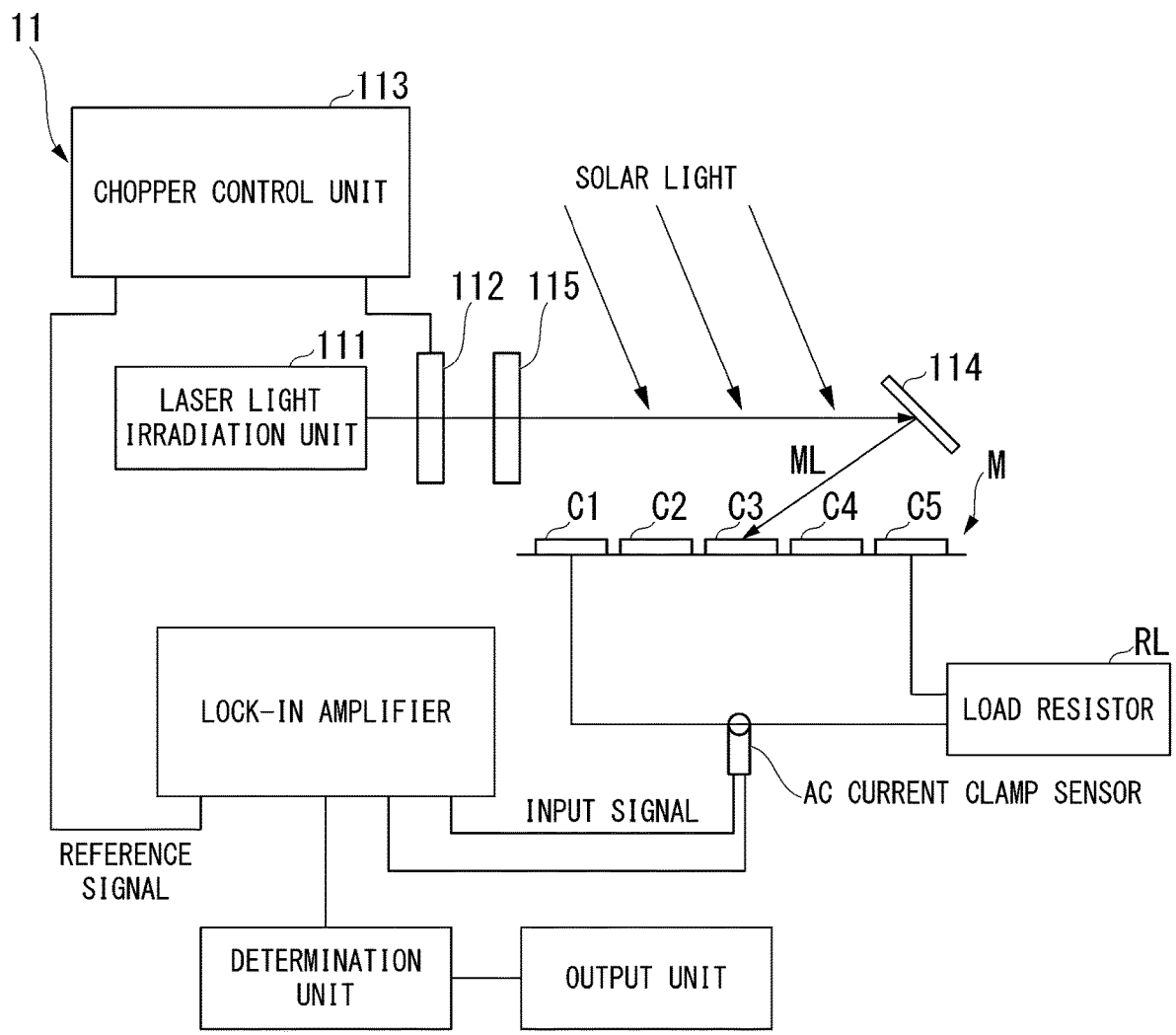
FIG. 1 is a diagram corresponding to FIG. 10 of Patent Document 1.

FIG. 1 is a diagram corresponding to FIG. 10 of Patent Document 1.

In a system shown in FIG. 1, only a certain photovoltaic cell C3 in a photovoltaic module M under power generation is irradiated with weak modulated light ML so that an operation voltage of the photovoltaic cell C3 does not change. A very small amount of synchronized signal with the modulated light ML is mixed in an output current of the photovoltaic module M according to the operation voltage of the photovoltaic cell C3. Therefore, a very small synchronized signal mixed in the output current of the photovoltaic module M is extracted by using an AC current clamp sensor and a lock-in amplifier that are electrically contactless with a wiring connected to the photovoltaic module M.

Figure 2:
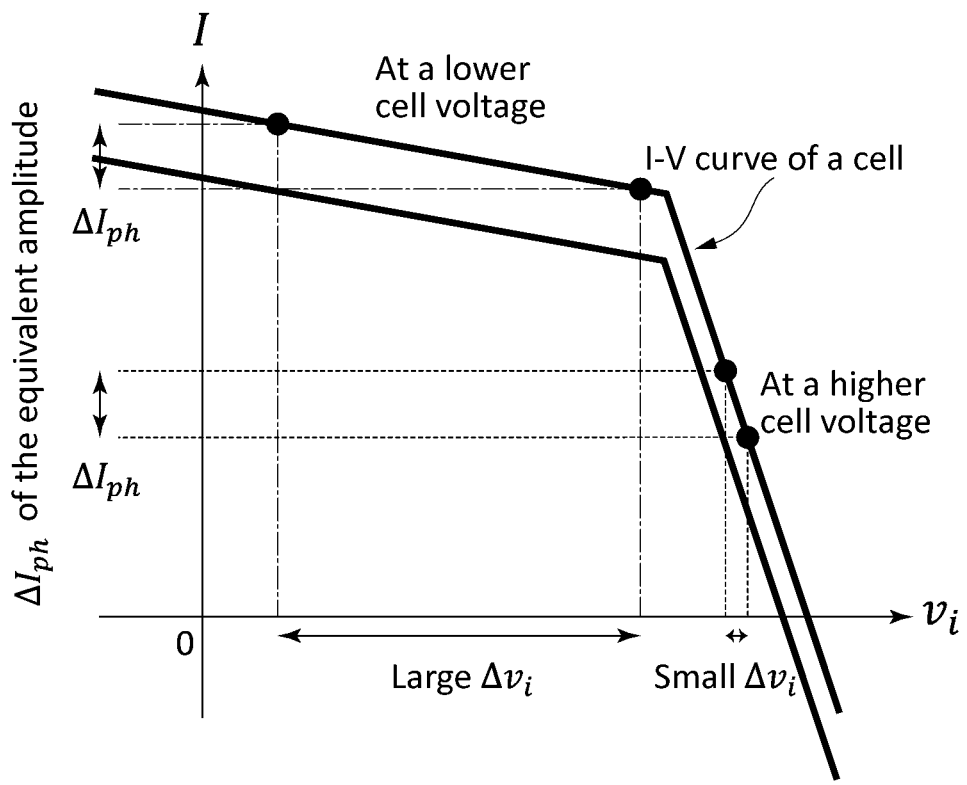
FIG. 2 is a diagram showing an example of an I-V curve explaining a qualitative principle of an operation of a photovoltaic cell shown in FIG. 1.

FIG. 2 is a diagram showing an example of an I-V curve explaining the qualitative principle of an operation of the photovoltaic cell C3 shown in FIG. 1. In detail, FIG. 2 is a diagram corresponding to FIG. 1 described in Kobayashi and Kisu, "A Proposal of Procedure to Estimate a Standard Line for Contactless Estimation of a Solar Cell Voltage in a Module using modulated Light", The Institute of Electrical Engineers of Japan Transactions on Power and Energy, Vol. 140, No. 1, pp. 14-24 (2020), DOI: 10.1541/ieejpes.140.14. In FIG. 2, a horizontal axis shows the operation voltage of the photovoltaic cell C3 (see FIG. 1), and a vertical axis shows the output current of the photovoltaic module M (see FIG. 1).

As shown in FIG. 2, as the operation voltage of the photovoltaic cell C3 decreases and an absolute value of a negative voltage increases (a left side portion of FIG. 2), a slope of the I-V curve becomes smaller. When the minute light-generated current derived from the modulated light ML irradiated to the photovoltaic cell C3 has a constant amplitude (indicated by "$\Delta I_{ph}$" in FIG. 2), a voltage change in the photovoltaic cell C3 (indicated by "Large $\Delta v_i$" and "Small $\Delta v_i$" in FIG. 2), that is, the amplitude of the synchronized signal with the modulated light increases in proportion to the reciprocal of the slope of the I-V curve. As the voltage change in the photovoltaic cell C3 increases, the minute change $\Delta I$ in the output current of the photovoltaic module M also increases, and the operation voltage of the photovoltaic cell C3 can be estimated from the amplitude of the synchronized signal extracted by the lock-in amplifier.

The slope of the I-V curve shown in FIG. 2 corresponds to the differential resistance of the photovoltaic cell C3, and the magnitude of the lock-in amplifier output $\Delta I_{ph}$ is proportional to the differential resistance of the photovoltaic cell C3. Therefore, in the technology disclosed in Patent Document 2, in order to quantitatively estimate a cell voltage (operation voltages of the photovoltaic cells C1 to C5) in the photovoltaic module M, all the photovoltaic cells C1 to C5, after measuring the lock-in amplifier output $\Delta I_{ph}$ when each of all the photovoltaic cells (C1 to C5) is irradiated with the modulated light, a ratio ($\Delta I_{phi}/\Sigma\Delta I_{phi}$) of a lock-in amplifier output $\Delta I_{phi}$ when a photovoltaic cell i (any of the photovoltaic cells C1 to C5) whose cell voltage (operation voltage) is desired to be estimated and the sum ($\Sigma\Delta I_{phi}$) of the lock-in amplifier output Mph when each of all the photovoltaic cells C1 to C5 is irradiated with the modulated light is used. When the value of the ratio ($\Delta I_{phi}/\Sigma\Delta I_{phi}$) is small, it is estimated that the value of the cell voltage (operation voltage) of the photovoltaic cell i is large.

The ratio ($\Delta I_{phi}/\Sigma\Delta I_{phi}$) can also be expressed using the differential resistance of each of the photovoltaic cells C1 to C5 instead of the lock-in amplifier output $\Delta I_{ph}$. In a case where the equivalent circuit constant of each of the photovoltaic cells C1 to C5 is measured in advance, the value of the ratio ($\Delta I_{phi}/\Sigma\Delta I_{phi}$) in an arbitrary cell voltage (the operation voltage of any of the photovoltaic cells) can be obtained by numerical simulation.

Therefore, the inventor of the present invention, verifies, in Kobayashi and Kisu, "A Proposal of Procedure to Estimate a Standard Line for Contactless Estimation of a Solar Cell Voltage in a Module using modulated Light", The Institute of Electrical Engineers of Japan Transactions on Power and Energy, Vol. 140, No. 1, pp. 14-24 (2020), DOI: 10.1541/ieejpes.140.14, influence of parallel resistance components (indicated by "$R_{sh1}$" and "$R_{sh2}$" in FIG. 3) included in the equivalent circuit of the photovoltaic cell to the ratio ($\Delta I_{phi}/\Sigma\Delta I_{phi}$).

Figure 3:
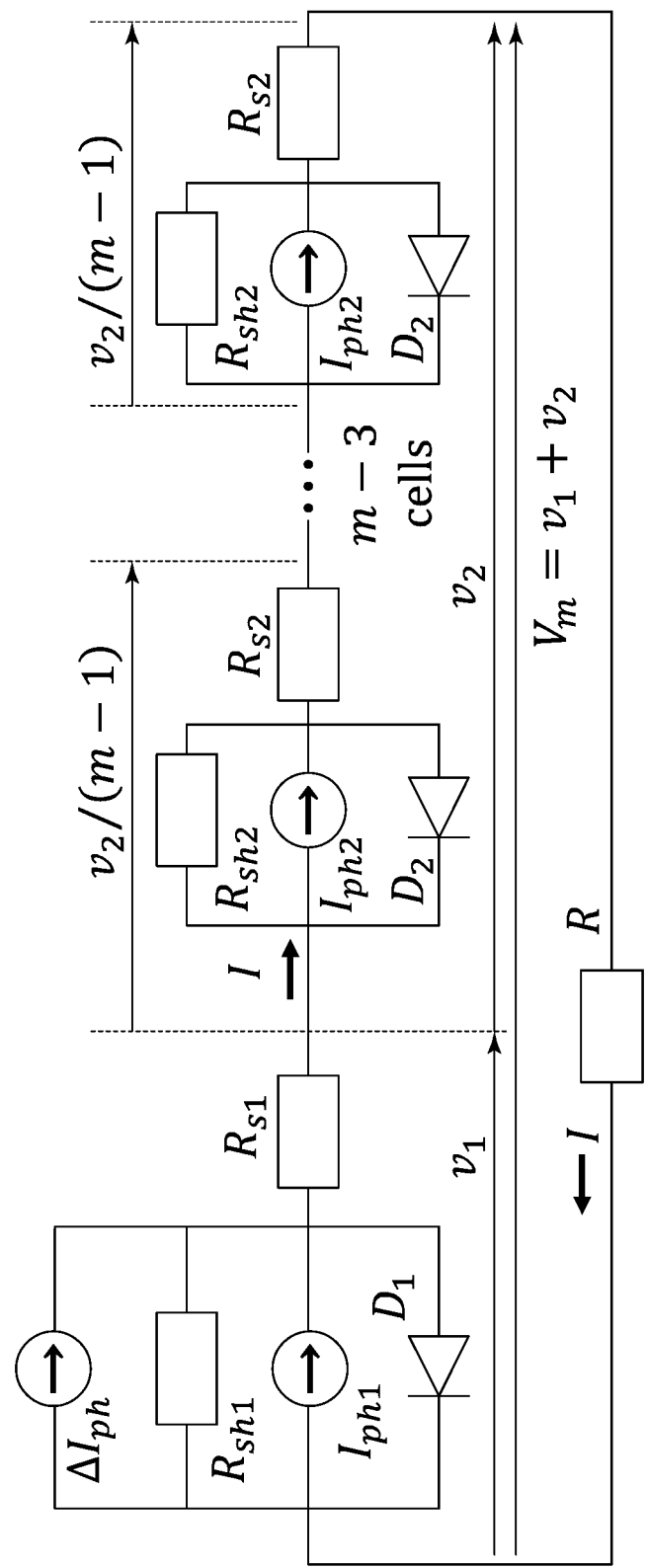
FIG. 3 is a diagram showing an equivalent circuit of a photovoltaic module composed of m photovoltaic cells.

FIG. 3 is a diagram showing an equivalent circuit of a photovoltaic module composed of m photovoltaic cells. In detail, FIG. 3 is a diagram corresponding to FIG. 3(a) described in Kobayashi and Kisu, "A Proposal of Procedure to Estimate a Standard Line for Contactless Estimation of a Solar Cell Voltage in a Module using modulated Light", The Institute of Electrical Engineers of Japan Transactions on Power and Energy, Vol. 140, No. 1, pp. 14-24 (2020), DOI: 10.1541/ieejpes.140.14. In FIG. 3, the leftmost photovoltaic cell is referred to as "cell 1", and the other remaining photovoltaic cells ((m−1) photovoltaic cells) are combined to form one photovoltaic cell "cell 2". There is no obvious loss of generality with this assumption.

Figure 4:
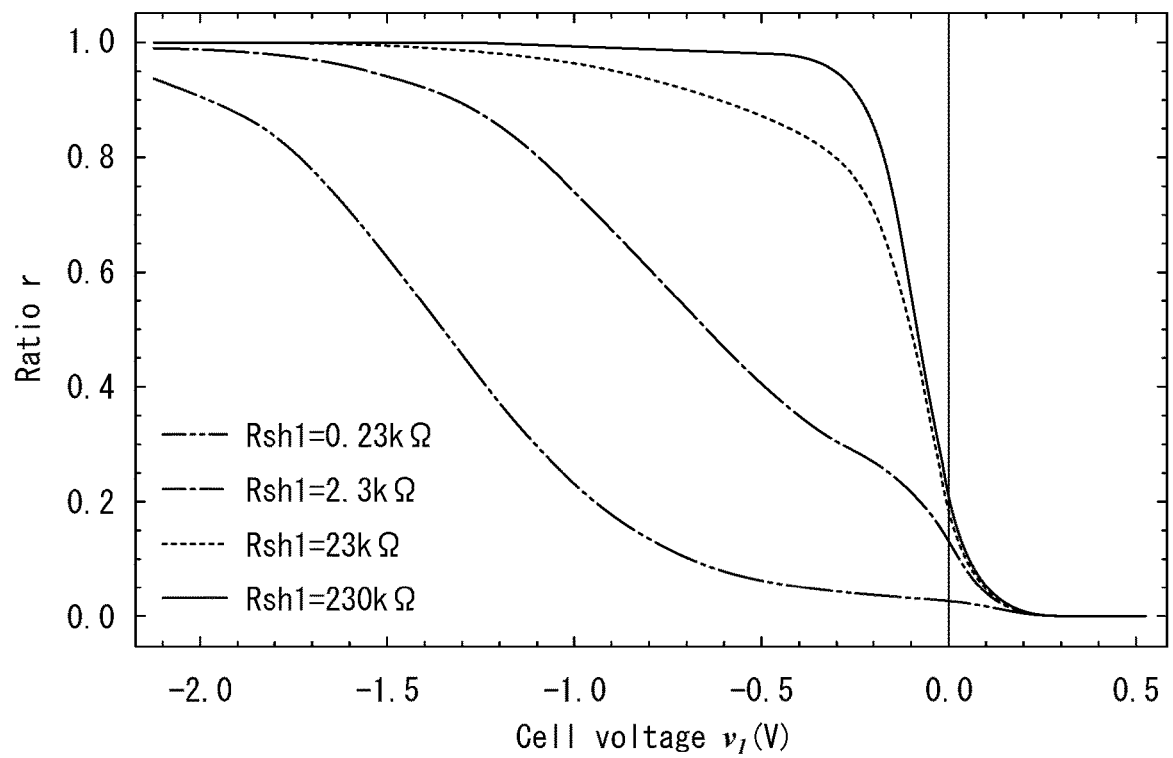
FIG. 4 is a diagram showing numerical simulation results of voltage dependence of "cell 1" of a ratio ($\Delta I_{phi}/\Sigma\Delta I_{phi}$) when only a parallel resistance component $R_{sh1}$ of "cell 1" is changed in constants of an equivalent circuit of an actual photovoltaic cell.

FIG. 4 is a diagram showing numerical simulation results of voltage dependence of "cell 1" of the ratio ($\Delta I_{phi}/\Sigma\Delta I_{phi}$) when only the parallel resistance component $R_{sh1}$ of "cell 1" is changed in the constants of the equivalent circuit of the actual photovoltaic cell. In detail, FIG. 4 is a diagram corresponding to FIG. 7 described in Kobayashi and Kisu, "A Proposal of Procedure to Estimate a Standard Line for Contactless Estimation of a Solar Cell Voltage in a Module using modulated Light", The Institute of Electrical Engineers of Japan Transactions on Power and Energy, Vol. 140, No. 1, pp. 14-24 (2020), DOI: 10.1541/ieejpes.140.14. In FIG. 4, the vertical axis indicates the ratio ($\Delta I_{phi}/\Sigma\Delta I_{phi}$), and the horizontal axis indicates the cell voltage.

In the numerical simulation shown in FIG. 4, a parallel resistance component $R_{sh1}=R_{sh2}=2.3$ k$\Omega$ is used as a standard. As a result, as shown in FIG. 4, it is known that, when the parallel resistance component $R_{sh1}$ is smaller than the standard parallel resistance component $R_{sh2}$ (=2.3 k$\Omega$), the value of the ratio ($\Delta I_{phi}/\Sigma\Delta I_{phi}$) is smaller than a case where the parallel resistance component $R_{sh1}$ is equal to the standard parallel resistance component $R_{sh2}$ (=2.3 k$\Omega$) even though the voltage $v_1$ of "cell 1" is the same. In contrast, it is known that, when the parallel resistance component $R_{sh1}$ is larger than the standard parallel resistance component $R_{sh2}$ (=2.3 k$\Omega$), the value of the ratio ($\Delta I_{phi}/\Sigma\Delta I_{phi}$) saturates to 1 when the voltage $v_1$ of "cell 1" is near 0 V. That is, the value of the ratio ($\Delta I_{phi}/\Sigma\Delta I_{phi}$) tends to be affected by the parallel resistance component of the photovoltaic cell to be measured.

Accordingly, as described above, the inventor of the present invention considers that, as a condition for effectively using the technology disclosed in Patent Document 2, it is important that the photovoltaic cells constituting the photovoltaic module have similar parallel resistance components and it is necessary to evaluate the parallel resistance component of each photovoltaic cell before measuring the voltage of the photovoltaic cell based on the technology disclosed in Patent Document 2.

Here, considering a deterioration phenomenon in the actual photovoltaic module, there is a potential induced degradation (PID) phenomenon derived from a high voltage part in the photovoltaic module or a decrease in the parallel resistance component of the photovoltaic cell derived from a current leakage defect of the photovoltaic cells derived from defective manufacturing or the like. The PID phenomenon is attracting attention as a cause of deterioration when a normal photovoltaic module is used for a long period of time. As a method for detecting a deteriorated part due to the PID phenomenon, an Electro-Luminescence (EL) method is put into practical use, in which an inspection module is separated from the wiring, current is injected in a dark box, and luminescence distribution is observed. However, when the EL method is used, it is necessary to stop power generation of the photovoltaic module, and the inspection itself is regarded as very heavy burden, so that improvements using other methods are desired.

Therefore, the inventor of the present invention has attempted to estimate the parallel resistance component of each of the photovoltaic cells C1 to C5 in the photovoltaic module M by using a measurement signal (output signal) $\Delta I$ of a phase detection unit (lock-in amplifier) used in the technology disclosed in Patent Document 1 and the technology disclosed in Patent Document 2.

[Principle]

In the abnormality determination system for a photovoltaic module and the abnormality determination method for a photovoltaic module of the present invention, similarly to the technology disclosed in Patent Document 1 and the technology disclosed in Patent Document 2, while applying modulated light only to the photovoltaic cells to be measured (more specifically, the photovoltaic cells to be subjected to determination of the presence or absence of an abnormality in the parallel resistance component) in the photovoltaic module M, the phase detection unit (lock-in amplifier) extracts a signal derived from the photovoltaic cell to be measured, the signal derived from the photovoltaic cell being synchronized with the modulated light from the output signal of the photovoltaic module M.

A new feature of the abnormality determination system for a photovoltaic module and the abnormality determination method for a photovoltaic module according to the present invention is that the operation voltage of the photovoltaic cell to be measured is changed by performing partial light shading of incident light only on the photovoltaic cell to be measured (for example, reducing the incident light applied to the photovoltaic cell to be measured by attaching a mask to the photovoltaic cell to be measured (mask dimming) or the like) or performing partial brightening of the incident light on the photovoltaic cell to be measured (for example, increasing the incident light applied to the photovoltaic cell to be measured by performing constant light irradiation of light (light brightening) or the like).

Figure 5:
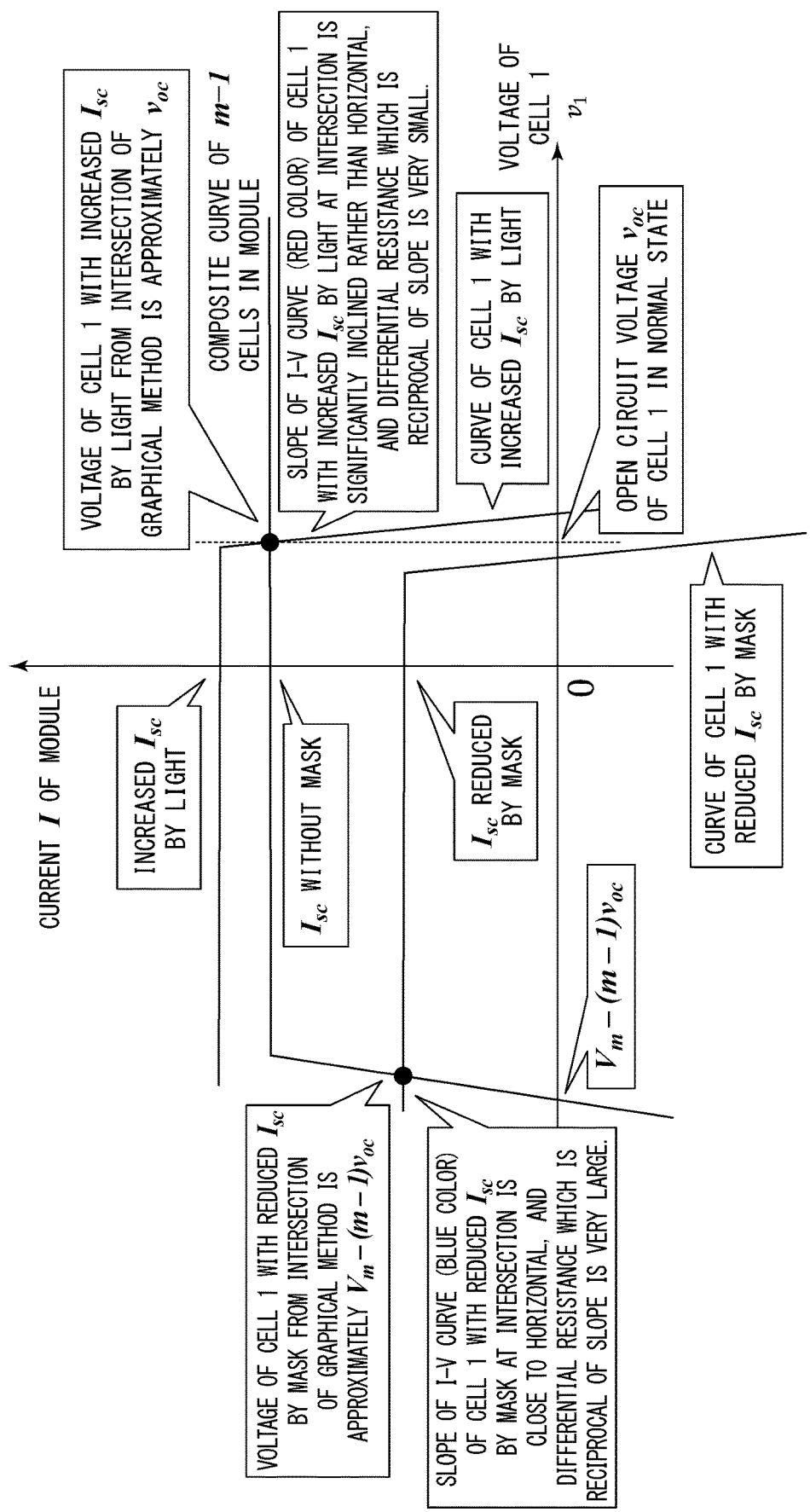
FIG. 5 is a diagram explaining operation voltages of a normal photovoltaic cell obtained by applying mask dimming and light brightening to the normal photovoltaic cell having a high parallel resistance component in the photovoltaic module.
Figure 6:
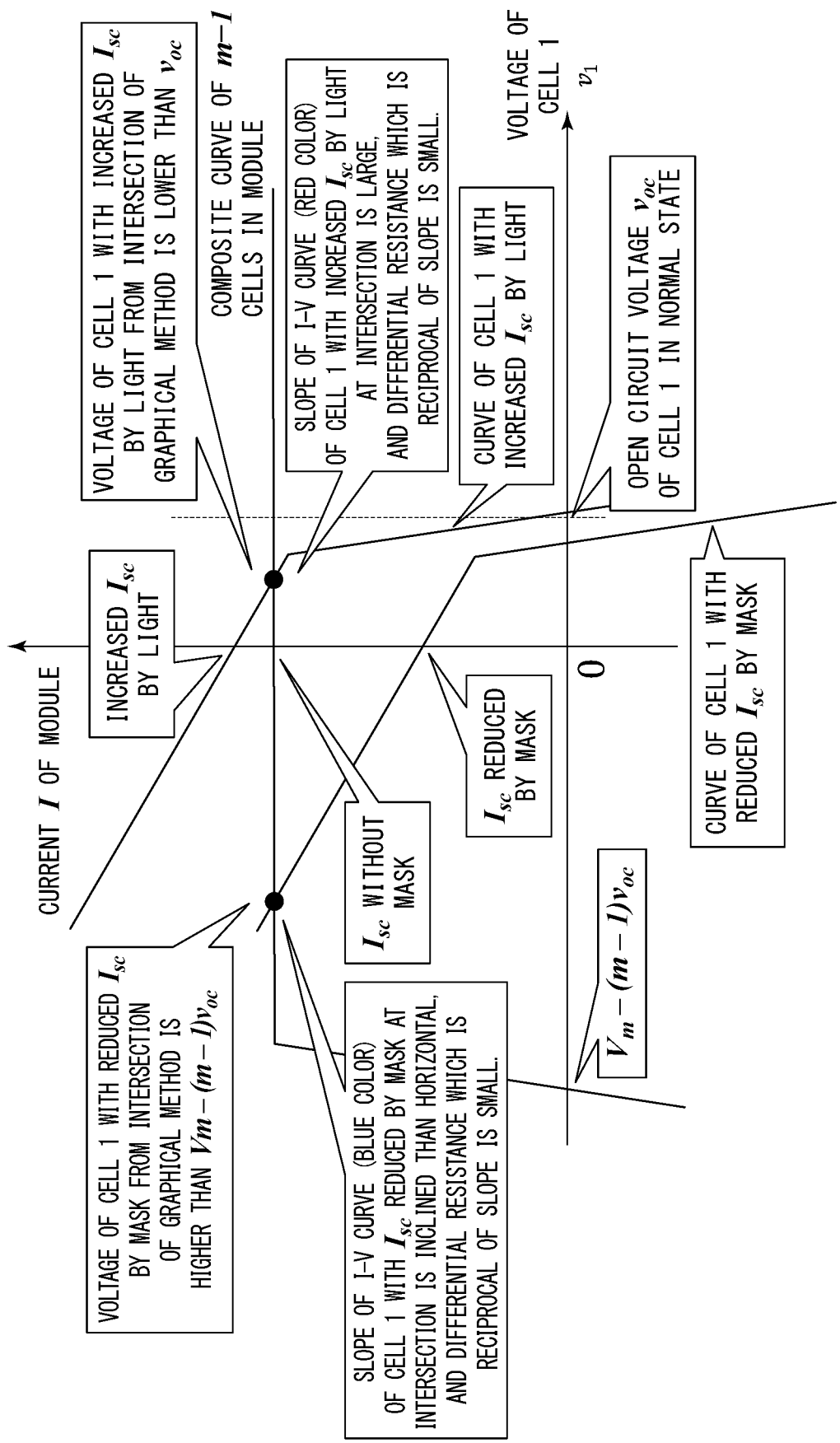
FIG. 6 is a diagram explaining operation voltages of a defective photovoltaic cell obtained by applying the mask dimming and the light brightening to the defective (abnormal) photovoltaic cell having a low parallel resistance component in the photovoltaic module.

In a case where the mask dimming is applied to the photovoltaic cell to be measured, the short-circuit current $I_{sc}$ of the photovoltaic cell to be measured is reduced compared with before the mask dimming is applied to the photovoltaic cell to be measured, and the I-V curve is moved in parallel in the negative direction of the vertical axis (downward in FIGS. 5 and 6). In contrast, in a case where the light brightening is applied to the photovoltaic cell to be measured, the short-circuit current $I_{sc}$ of the photovoltaic cell to be measured is increased compared with before the light brightening is applied to the photovoltaic cell to be measured, and the I-V curve is moved in parallel in the positive direction of the vertical axis (upward in FIGS. 5 and 6).

FIG. 5 is a diagram explaining the operation voltages of a normal photovoltaic cell obtained by applying the mask dimming and the light brightening to the normal photovoltaic cell having a high parallel resistance component in the photovoltaic module M.

In FIG. 5, in the photovoltaic module M composed of m photovoltaic cells, the photovoltaic cell to be measured (normal photovoltaic cell) is represented by "cell 1". In FIG. 5, a horizontal axis indicates the operation voltage $v_1$ of "cell 1", and a vertical axis indicates the output current I of the photovoltaic module M. Since the photovoltaic module M has all the photovoltaic cells connected in series, the equivalent output current I flows through all the photovoltaic cells including the cell 1.

The operation voltage $v_1$ of "cell 1" at the operation voltage $V_m$ of the photovoltaic module M can be roughly estimated as follows from the graphical method shown in FIG. 5. For simplicity, the open circuit voltage of each photovoltaic cell (the open circuit voltage of "cell 1" in a normal state (a state in which neither the mask light shading nor the light brightening is applied)) is set as $v_{oc}$.

When the mask dimming is applied to a normal photovoltaic cell ("cell 1") having a high parallel resistance component, the I-V curve is a "curve of cell 1 with reduced $I_{sc}$ (short-circuit current) by mask", which is shown in FIG. 5. The operation voltage $v_1$ of "cell 1" is represented by the intersection of "the curve of cell 1 with reduced $I_{sc}$ by mask" and "the composite curve of m−1 cells in the module", which are shown in FIG. 5. That is, the operation voltage $v_1$ of "cell 1" is represented by the following Equation (1). Also, as shown in FIG. 5, the slope of "the curve of cell 1 with reduced $I_{sc}$ by mask" at the intersection is close to horizontal (that is, the slope is approximately zero). The differential resistance of "cell 1" corresponds to the reciprocal of the slope and is very large. The value of the vertical axis at the intersection represents the "$I_{sc}$ reduced by mask".

$$v_1 \cong V_m - (m-1)v_{oc} \quad (1)$$

When the light brightening is applied to the normal photovoltaic cell ("cell 1") having the high parallel resistance component), the I-V curve becomes a "curve of cell 1 with increased $I_{sc}$ (short-circuit current) by light", which is shown in FIG. 5. The operation voltage $v_1$ of "cell 1" is represented by the intersection of "the curve of cell 1 with increased $I_{sc}$ by light" and "the composite curve of m−1 cells in the module", which are shown in FIG. 5. That is, the operation voltage $v_1$ of "cell 1" is represented by the following Equation (2). In addition, as shown in FIG. 5, the slope of "the curve of cell 1 with increased $I_{sc}$ by light" at the intersection is very large. The differential resistance of "cell 1" corresponds to the reciprocal of the slope and is very small. The value of the vertical axis at the intersection of "the composite curve of m−1 cells in the module" and the vertical axis (at which the operation voltage $v_1$ of "cell 1" is zero) represents "$I_{sc}$ without mask". The value of the vertical axis in the horizontal portion of "the curve of cell 1 with increased $I_{sc}$ (short-circuit current) by light" represents the "$I_{sc}$ increased by light".

$$v_1 \cong v_{oc} \quad (2)$$

As shown in FIG. 5, the ratio r between the differential resistance (very large) of "cell 1" at the mask dimming and the differential resistance (very small) of "cell 1" at the light brightening is very large.

Since the operation voltage $V_m$ of the photovoltaic module M can be easily measured outside the photovoltaic module M, as described above, the operation voltage $v_1$ of "cell 1" can be easily estimated by applying the mask dimming and the light brightening to "cell 1".

FIG. 6 is a diagram explaining the operation voltages of the defective photovoltaic cell obtained by applying the mask dimming and the light brightening to the defective (abnormal) photovoltaic cell having the low parallel resistance component in the photovoltaic module M.

In FIG. 6, in the photovoltaic module M composed of m photovoltaic cells, the photovoltaic cell to be measured (defective photovoltaic cell) is represented by "cell 1". In FIG. 6, a horizontal axis indicates the operation voltage $v_1$ of "cell 1", and a vertical axis indicates the output current I of the photovoltaic module M. Since the photovoltaic module M has all the photovoltaic cells connected in series, the equivalent output current I flows through all the photovoltaic cells including the cell 1.

The operation voltage $v_1$ of "cell 1" at the operation voltage $V_m$ of the photovoltaic module M can be roughly estimated as follows from the graphical method shown in FIG. 6.

When the mask dimming is applied to the defective photovoltaic cell ("cell 1") having the low parallel resistance component, the I-V curve is a "curve of cell 1 with reduced $I_{sc}$ (short-circuit current) by mask", which is shown in FIG. 6. The operation voltage $v_1$ of "cell 1" is represented by the intersection of "the curve of cell 1 with reduced $I_{sc}$ by mask" and "the composite curve of m−1 cells in the module" shown in FIG. 6. That is, the operation voltage $v_1$ of "cell 1" is represented by the following Equation (3). Also, as shown in FIG. 6, the slope of "the curve of cell 1 with reduced $I_{sc}$ by mask" at the intersection is greater than zero. The differential resistance of "cell 1" corresponds to the reciprocal of the slope and is small.

The value of the vertical axis at the intersection of "the composite curve of m−1 cells in the module" and the vertical axis (at which the operation voltage $v_1$ of "cell 1" is zero) represents "$I_{sc}$ without mask". The value of the vertical axis at the intersection of "the curve of cell 1 with reduced $I_{sc}$ (short-circuit current) by mask" and the vertical axis (the operation voltage $v_1$ of "cell 1" is zero) indicates the "$I_{sc}$ reduced by the mask".

$$v_1 > V_m - (m-1)v_{oc} \quad (3)$$

When light brightening is applied to the defective photovoltaic cell having the low parallel resistance component ("cell 1"), the I-V curve becomes "the curve of cell 1 with increased $I_{sc}$ (short-circuit current)" by light, which is shown in FIG. 6. The operation voltage $v_1$ of "cell 1" is represented by the intersection of "the curve of cell 1 with increased $I_{sc}$ by light" and "the composite curve of m−1 cells in the module" shown in FIG. 6. That is, the operation voltage $v_1$ of "cell 1" is represented by the following Equation (4). Also, as shown in FIG. 6, the slope of "the curve of cell 1 with increased $I_{sc}$ by light" at the intersection is greater than zero, and is similar to the slope of "the curve of cell 1 with reduced $I_{sc}$ by mask" at the intersection of "the curve of cell 1 with reduced $I_{sc}$ by mask" and "the composite curve of m−1 cells in the module". The differential resistance of "cell 1" corresponds to the reciprocal of the slope and is small.

That is, the differential resistance of "cell 1" when the light brightening is applied to the defective "cell 1" having the low parallel resistance component is similar to the differential resistance of "cell 1" when the mask dimming is applied to "cell 1".

The value of the vertical axis at the intersection of "the curve of cell 1 with increased $I_{sc}$ by light" and the vertical axis (operation voltage $v_1$ of "cell 1" is zero) represents the "increased $I_{sc}$ by light".

$$v_1 < v_{oc} \quad (4)$$

As shown in FIG. 6, the value of the ratio r between the differential resistance (small) of "cell 1" at the mask dimming and the differential resistance (small) of "cell 1" at the light brightening is approximately "1".

Even in the defective photovoltaic cell having the low parallel resistance component, the operation voltage of the photovoltaic cell to which the mask dimming and the light brightening are applied changes, but a range in which the operation voltage changes becomes smaller than the normal photovoltaic cell having the high parallel resistance component.

From the above, the inventor of the present invention has found that, in order to estimate whether the parallel resistance component of each of the plurality of photovoltaic cells connected in series in the photovoltaic module M is normal or defective (abnormal), which is lower than normal, it is sufficient to confirm whether or not the ratio r of the differential resistance of the photovoltaic cell when, for example, the mask dimming is applied to the differential resistance of the photovoltaic cell when, for example, the light brightening is applied is equal to or greater than a predetermined threshold value.

In addition, the inventor of the present invention has found that, in order to confirm whether or not the value of the ratio r of the differential resistance of the photovoltaic cell when, for example, the mask dimming is applied to the differential resistance of the photovoltaic cell when, for example, the light brightening is applied is equal to or greater than the predetermined threshold value, it is sufficient to confirm whether or not a ratio of the value of the phase detection unit output (for example, the output of the lock-in amplifier) when, for example, the mask dimming is applied to the photovoltaic cell to be subjected to determination of the presence or absence of the abnormality and the value of the phase detection unit output (for example, the output of the lock-in amplifier) when, for example, the light brightening is applied to the photovoltaic cell to be subjected to determination for the presence or absence of the abnormality is equal to or greater than a threshold value set in advance.

In other words, the inventor of the present invention has found that, by comparing the threshold value set in advance with a ratio of the value of the phase detection unit output (for example, the output of the lock-in amplifier) when the mask dimming is applied to the photovoltaic cell to be subjected to determination for the presence or absence of the abnormality and the value of the phase detection unit output (for example, the output of the lock-in amplifier) when, for example, the light brightening is applied to the photovoltaic cell to be subjected to determination of the presence or absence of the abnormality, it is possible to estimate whether the parallel resistance component of each of the plurality of photovoltaic cells connected in series in the photovoltaic module M is normal or defective (abnormal), which is lower than normal.

First Embodiment

Embodiments of the abnormality determination system for a photovoltaic module and the abnormality determination method for a photovoltaic module according to the present invention will be described below.

Figure 7:
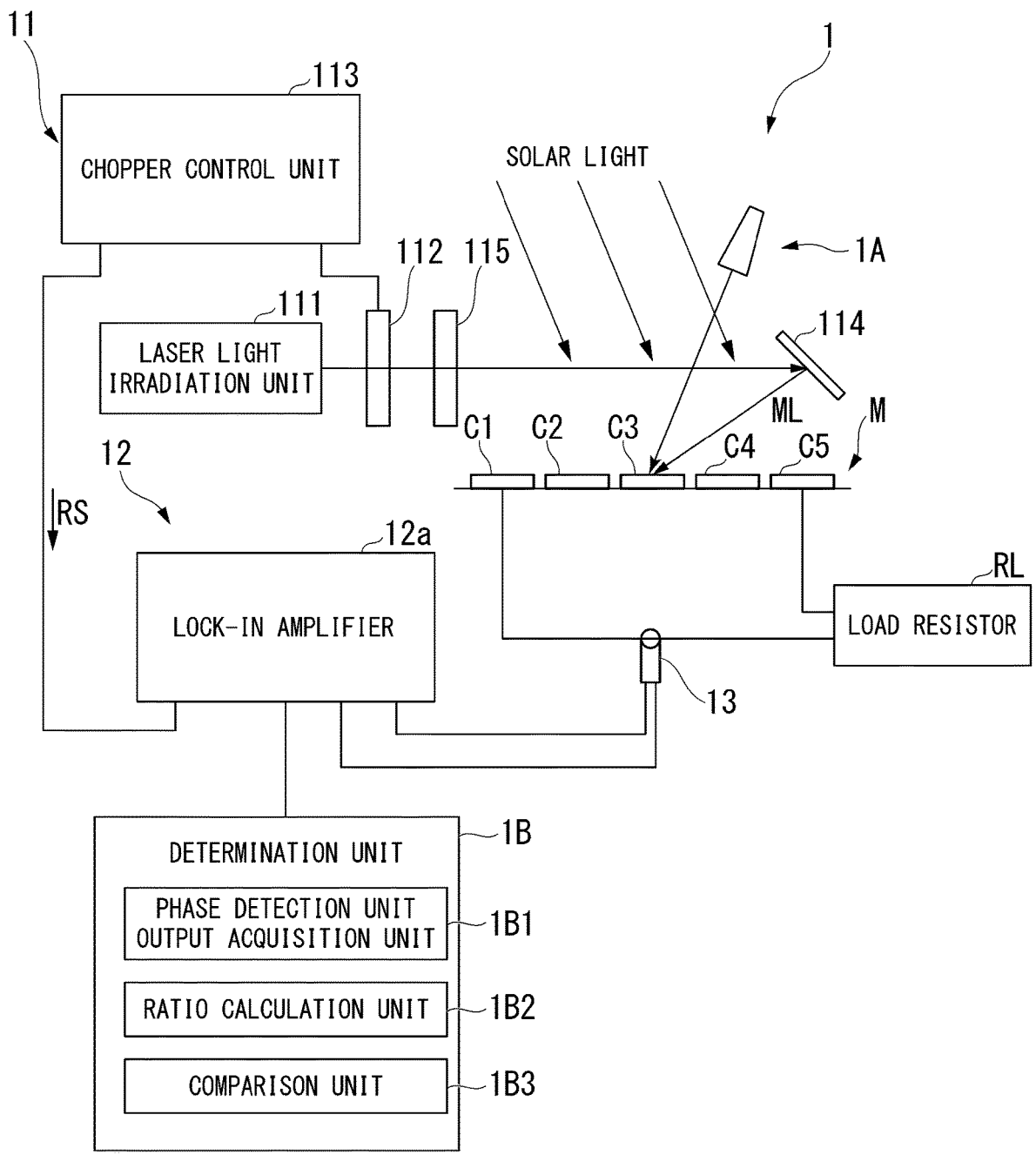
FIG. 7 is a diagram showing an example of a configuration of an abnormality determination system for a photovoltaic module of a first embodiment.

FIG. 7 is a diagram showing an example of the configuration of an abnormality determination system 1 for the photovoltaic module M of a first embodiment.

In the example shown in FIG. 7, the abnormality determination system 1 for the photovoltaic module M of the first embodiment is applied to the photovoltaic module M. The photovoltaic module M is composed of a plurality of photovoltaic cells C1, C2, C3, C4, and C5 connected in series. The photovoltaic module M is connected to a load resistor RL.

In the example shown in FIG. 7, the photovoltaic module M is composed of the five photovoltaic cells C1, C2, C3, C4, and C5. However, in another example, the photovoltaic module M may be composed of an arbitrary number (m, m is an integer which is equal to or greater than 2) of photovoltaic cells connected in series, the arbitrary number being other than five.

In the example shown in FIG. 7, the abnormality determination system 1 of the photovoltaic module M can determine whether or not each of the parallel resistance components of the photovoltaic cells C1, C2, C3, C4, and C5 is abnormal. An abnormality determination system 1 for the photovoltaic module M includes an irradiation state control unit 1A, a modulated light irradiation unit 11, a phase detection unit 12, an AC current clamp sensor 13, and a determination unit 1B.

The irradiation state control unit 1A controls the irradiation state of the incident light with respect to the photovoltaic cell (in the example shown in FIG. 7, the photovoltaic cell C3) to be subjected to determination of the presence or absence of the abnormality in the parallel resistance component as at least a first irradiation state and a second irradiation state which is a state in which the short-circuit current of the photovoltaic cell C3 is larger than that in the first irradiation state.

Specifically, the irradiation state control unit 1A sets the irradiation state of the incident light on the photovoltaic cell C3 as the first irradiation state by disposing (for example, attaching) a mask on a part of the light-receiving surface of the photovoltaic cell C3 to be subjected to determination of the presence or absence of the abnormality in the parallel resistance component (that is, by applying mask light shading). That is, the first irradiation state is a state in which control is performed to reduce the incident light applied to the photovoltaic cell C3 to be subjected to determination of the presence or absence of the abnormality in the parallel resistance component.

In addition, the irradiation state control unit 1A sets the irradiation state of the incident light on the photovoltaic cell C3 as the second irradiation state by irradiating a light-receiving surface of the photovoltaic cell C3 with light other than the solar light (for example, LED irradiation light) (that is, by applying the light brightening). That is, the second irradiation state is a state in which control is performed to increase the incident light applied to the photovoltaic cell C3 to be subjected to determination of the presence or absence of the abnormality in the parallel resistance component.

In another example, the irradiation state control unit 1A may set the irradiation state of the incident light on the photovoltaic cell C3 as the first irradiation state by attaching a mesh (not shown) to a part of the light-receiving surface of the photovoltaic cell C3 to be subjected to determination of the presence or absence of the abnormality in the parallel resistance component.

In further another example, the irradiation state control unit 1A may set the irradiation state of the incident light on the photovoltaic cell C3 as the first irradiation state by disposing a light-shading object (not shown) that blocks the irradiation of solar light to the light-receiving surface of the photovoltaic cell C3 to be subjected to determination of the presence or absence of the abnormality in the parallel resistance component.

In another example, the irradiation state control unit 1A may set the irradiation state of the incident light on the photovoltaic cell C3 as the second irradiation state by irradiating the light-receiving surface of the photovoltaic cell C3 with irradiation light (for example, laser light) of a light source other than the LED light.

In the example shown in FIG. 7, the modulated light irradiation unit 11 irradiates the light-receiving surface of the photovoltaic cell C3 to be subjected to determination of the presence or absence of the abnormality in the parallel resistance component with the modulated light ML which is different from the above-described incident light (that is, irradiation light such as solar light and LED light). The modulated light irradiation unit 11 includes a laser light irradiation unit 111, a light chopper unit 112, a chopper control unit 113, a reflector 114, and a filter 115. The laser light irradiation unit 111 irradiates, for example, laser light such as a He—Ne laser.

In the example shown in FIG. 7, as described above, the modulated light irradiation unit 11 includes the laser light irradiation unit 111. However, in another example, the modulated light irradiation unit 11 may include an irradiation unit that irradiates light other than the laser light.

In the example shown in FIG. 7, the light chopper unit 112 modulates the laser light irradiated from the laser light irradiation unit 111 into the modulated light ML having a predetermined phase (frequency). The chopper control unit 113 controls the light chopper unit 112. Further, the chopper control unit 113 outputs a reference signal RS indicating the phase (frequency) of the modulated light ML modulated by the light chopper unit 112. The filter 115 dims the modulated light ML modulated by the light chopper unit 112. The filter 115 is, for example, a Neutral Density (ND) filter. The reflector 114 reflects the modulated light ML dimmed by the filter 115. The modulated light ML reflected by the reflector 114 is irradiated to the photovoltaic cell C3 to be subjected to determination of the presence or absence of the abnormality in the parallel resistance component.

In the example shown in FIG. 7, the modulated light ML reflected by the reflector 114 is applied to the photovoltaic cell C3. However, in another example, instead, the modulated light ML reflected by the reflector 114 may be applied to any of the photovoltaic cells C1, C2, C4, and C5 (the photovoltaic cell to be subjected to determination of the presence or absence of the abnormality in the parallel resistance component) other than the photovoltaic cell C3.

In the example shown in FIG. 7, between the laser light irradiation unit 111 and the photovoltaic module M, the light chopper unit 112, the filter 115, and the reflector 114 are arranged in the order of the light chopper unit 112, the filter 115, and the reflector 114. In another example, instead, the order of the arrangement of the light chopper unit 112, the filter 115, and the reflector 114 may be different.

In the example shown in FIG. 7, the phase detection unit 12 detects a minute change in the output current of the photovoltaic module M caused by the irradiation of the modulated light ML to the photovoltaic cell C3 to be subjected to determination of the presence or absence of the abnormality in the parallel resistance component. Furthermore, the phase detection unit 12 outputs the detection result as the phase detection unit output. The phase detection unit 12 has a lock-in amplifier 12a.

The lock-in amplifier 12a is connected to the AC current clamp sensor 13 that is electrically contactless with the wiring connected to the photovoltaic module M. That is, the phase detection unit 12 detects a minute change in the output current of the photovoltaic module M via the AC current clamp sensor 13 and the lock-in amplifier 12a.

The reference signal RS output from the chopper control unit 113 is input to the lock-in amplifier 12a. That is, the reference signal RS that is input to the lock-in amplifier 12a indicates the phase (frequency) of the modulated light ML that is irradiated from the modulated light irradiation unit 11 to the photovoltaic cell C3 to be subjected to determination of the presence or absence of the abnormality in the parallel resistance component.

The output of the lock-in amplifier 12a (phase detection unit output) indicates the detection result of the minute change in the output current of the photovoltaic module M accompanying the irradiation of the modulated light ML to the photovoltaic cell C3 to be subjected to determination of the presence or absence of the abnormality in the parallel resistance component.

The determination unit 1B determines whether or not the photovoltaic cell C3 to be subjected to determination has the abnormality in the parallel resistance component. The determination unit 1B includes a phase detection unit output acquisition unit 1B1, a ratio calculation unit 1B2, and a comparison unit 1B3.

The phase detection unit output acquisition unit 1B1 acquires the phase detection unit output (the output of the lock-in amplifier 12a). Specifically, the phase detection unit output acquisition unit 1B1 acquires the phase detection unit output (the output of the lock-in amplifier 12a) in the first irradiation state when the irradiation state control unit 1A controls the irradiation state of the incident light on the photovoltaic cell C3 to be subjected to determination of the presence or absence of the abnormality in the parallel resistance component to the first irradiation state. Further, the phase detection unit output acquisition unit 1B1 acquires the phase detection unit output (the output of the lock-in amplifier 12a) in the second irradiation state when the irradiation state control unit 1A controls the irradiation state of the incident light on the photovoltaic cell C3 to be subjected to determination of the presence or absence of the abnormality in the parallel resistance component to the second irradiation state.

The ratio calculation unit 1B2 calculates a ratio of the phase detection unit output (output of the lock-in amplifier 12a) in the first irradiation state, which is acquired by the phase detection unit output acquisition unit 1B1, to the phase detection unit output (output of the lock-in amplifier 12a) in the second irradiation state.

The comparison unit 1B3 compares the ratio of the phase detection unit output (the output of the lock-in amplifier 12a) in the first irradiation state, which is calculated by the ratio calculation unit 1B2, to the phase detection unit output (the output of the lock-in amplifier 12a) in the second irradiation state with a threshold value set in advance.

When the ratio of the phase detection unit output (the output of the lock-in amplifier 12a) in the first irradiation state to the phase detection unit output (the output of the lock-in amplifier 12a) in the second irradiation state is equal to or greater than a threshold value set in advance, the determination unit 1B determines that the photovoltaic cell C3 to be subjected to determination does not have the abnormality in the parallel resistance component (that is, determines that the parallel resistance component of the photovoltaic cell C3 to be subjected to determination is normal). On the other hand, when the ratio of the phase detection unit output (the output of the lock-in amplifier 12a) in the first irradiation state to the phase detection unit output (the output of the lock-in amplifier 12a) in the second irradiation state is less than a threshold value set in advance, the determination unit 1B determines that the photovoltaic cell C3 to be subjected to determination has the abnormality in the parallel resistance component (more specifically, determines that the photovoltaic cell C3 to be subjected to determination has the parallel resistance component which is abnormally low).

In order for the phase detection unit output acquisition unit 1B1 to appropriately acquire the phase detection unit output (the output of the lock-in amplifier 12a) in the first irradiation state, it is necessary that the intersection of "the curve of cell 1 with reduced $I_{sc}$ by mask" and "the composite curve of m−1 cells in the module", which are shown in FIG. 5, with respect to the normal photovoltaic cell be present at a part where the slope of the "composite curve of m−1 cells in the module" is large. That is, it is necessary to perform mask dimming (mask light shading) using a mask having a sufficient area.

In order for the phase detection unit output acquisition unit 1B1 to appropriately acquire the phase detection unit output (the output of the lock-in amplifier 12a) in the second irradiation state, it is necessary that most of the part where the slope is small or the part where the slope is almost zero in "the curve of cell 1 with $I_{sc}$ increases by light" shown in FIGS. 5 and 6 be located on the positive side of the vertical axis (upper sides in FIGS. 5 and 6) rather than the part where the slope is approximately zero in "the composite curve of m−1 cells in the module". That is, the "$I_{sc}$ increased by light" shown in FIGS. 5 and 6 is necessary to be greater than the "$I_{sc}$ without mask".

The irradiation state control unit 1A may perform in advance any of the control to set the irradiation state of the incident light on the photovoltaic cell (in the example shown in FIG. 7, the photovoltaic cell C3) to be subjected to determination of the presence or absence of the abnormality in the parallel resistance component to the first irradiation state, and the control to set the irradiation state of the incident light on the photovoltaic cell to be subjected to determination for the presence or absence of the abnormality in the parallel resistance component to the second irradiation state.

The threshold value used for the comparison by the comparison unit 1B3 is set in advance by using a photovoltaic module composed only of a plurality of photovoltaic cells having normal parallel resistance components confirmed using another method (for example, the EL method described above) and a photovoltaic module that includes an abnormal photovoltaic cell having a low parallel resistance component.

It is necessary that light other than solar light (for example, LED irradiation light), which is used by the irradiation state control unit 1A to set the irradiation state of the incident light on the photovoltaic cell C3 to be subjected to determination of the presence or absence of the abnormality in the parallel resistance component to the second irradiation state, have a wavelength that is absorbed by the photovoltaic cell C3 and output a generated current.

In an example of the abnormality determination system 1 for the photovoltaic module M of the first embodiment, the light irradiated by the irradiation state control unit 1A for setting the irradiation state of the incident light on the photovoltaic cell C3 to the second irradiation state is the constant light of the LED light. However, in another example of the abnormality determination system 1 for the photovoltaic module M of the first embodiment, the light irradiated by the irradiation state control unit 1A for setting the irradiation state of the incident light on the photovoltaic cell C3 to the second irradiation state may be modulated light instead of constant light. However, the phase (frequency) of the modulated light is set to a value different from the phase (frequency) of the modulated light ML irradiated by the modulated light irradiation unit 11.

The irradiation area and the irradiation intensity per unit area of the light irradiated by the irradiation state control unit 1A for setting the irradiation state of the incident light on the photovoltaic cell C3 to the second irradiation state are set such that $I_{sc}$ increased by light is greater than $I_{sc}$ without mask as shown in FIGS. 5 and 6.

In one example of the abnormality determination system 1 for the photovoltaic module M of the first embodiment, the directivity of the light irradiated by the irradiation state control unit 1A is set so that the light irradiated by the irradiation state control unit 1A in order to set the irradiation state of the incident light on the photovoltaic cell C3 to the second irradiation state is not irradiated to the other photovoltaic cells C1, C2, C4, and C5. Specifically, laser light is used as the light irradiated by the irradiation state control unit 1A.

In another example of the abnormality determination system 1 for the photovoltaic module M of the first embodiment, the light irradiated by the irradiation state control unit 1A in order to set the irradiation state of the incident light on the photovoltaic cell C3 to the second irradiation state may be irradiated to any of the other photovoltaic cells C1, C2, C4, and C5. When the light irradiated by the irradiation state control unit 1A is irradiated to any of the other photovoltaic cells C1, C2, C4, and C5 (that is, when the light is leaked and irradiated to any of the other photovoltaic cells C1, C2, C4, and C5), the abnormality determination system 1 for the photovoltaic module M of the first embodiment can determine the presence or absence of the abnormality in the parallel resistance component of the photovoltaic cell C3 in a case where the amount of increase in the short-circuit current $I_{sc}$ of the photovoltaic cell C3 accompanying the light irradiation by the irradiation state control unit 1A is larger than the amount of increase in the short-circuit current $I_{sc}$ of each of the photovoltaic cells C1, C2, C4, and C5 accompanying the light irradiation by the irradiation state control unit 1A.

Figure 8:
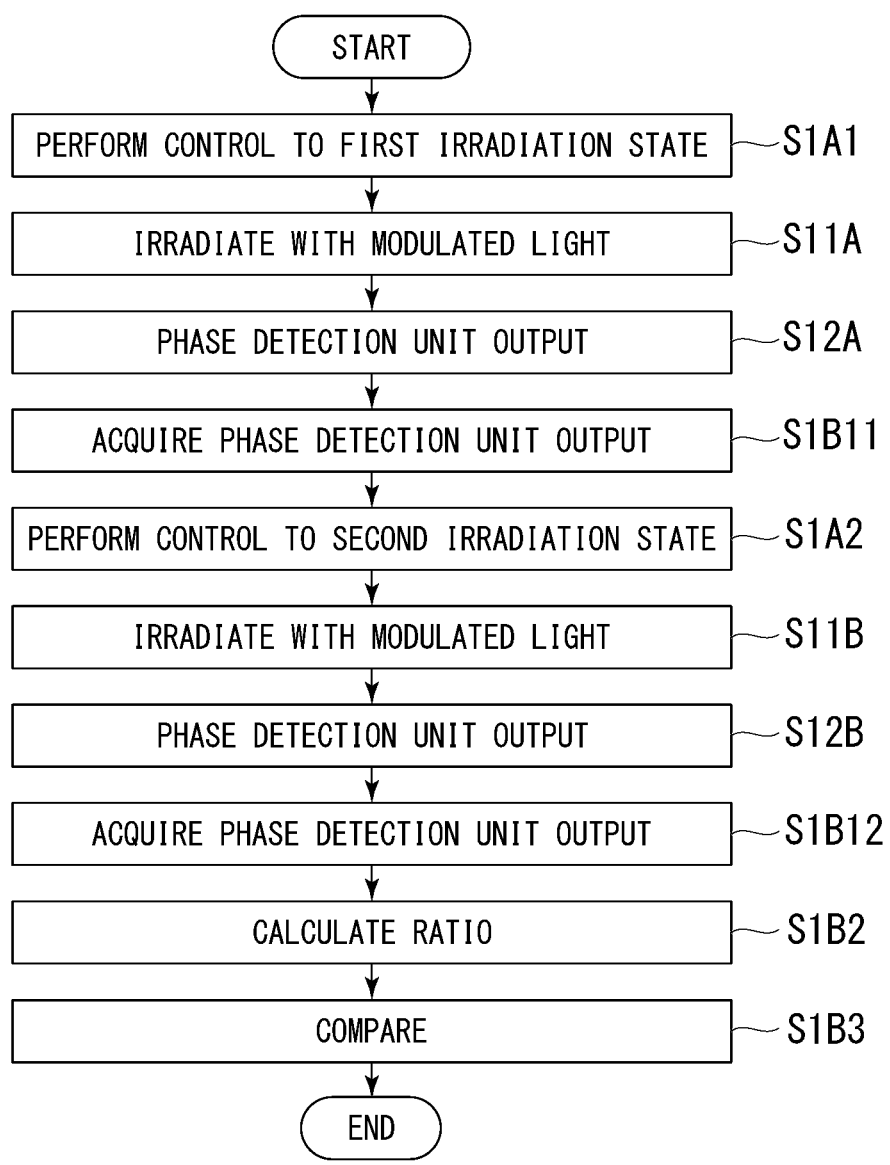
FIG. 8 is a flowchart explaining an example of a process executed in the abnormality determination system for a photovoltaic module of the first embodiment.

FIG. 8 is a flowchart explaining an example of a process executed in the abnormality determination system 1 for the photovoltaic module M of the first embodiment.

In the example shown in FIG. 8, in step S1A1, the irradiation state control unit 1A controls the irradiation state of the incident light on the photovoltaic cell (for example, photovoltaic cell C3) to be subjected to determination of the presence or absence of the abnormality in the parallel resistance component to the first irradiation state. For example, the irradiation state control unit 1A sets the irradiation state of the incident light on the photovoltaic cell C3 to the first irradiation state by arranging a mask at a part of the light-receiving surface of the photovoltaic cell C3.

Next, in step S11A, in a state in which the irradiation state of the incident light on the photovoltaic cell C3 to be subjected to determination of the presence or absence of the abnormality in the parallel resistance component is controlled to the first irradiation state by the irradiation state control unit 1A (for example, in a state in which the mask is arranged at a part of the light-receiving surface of the photovoltaic cell C3), the modulated light irradiation unit 11 irradiates the light-receiving surface of the photovoltaic cell C3 with the modulated light ML.

Next, in step S12A, the phase detection unit 12 detects a minute change in the output current of the photovoltaic module M accompanying irradiation of the modulated light ML to the photovoltaic cell C3 in the first irradiation state. Furthermore, the phase detection unit 12 outputs the detection result as the phase detection unit output in the first irradiation state.

Next, in step S1B11, the phase detection unit output acquisition unit 1B1 acquires the phase detection unit output (the output of the lock-in amplifier 12a), which is output by the phase detection unit 12 in step S12A, in the first irradiation state.

Further, in step S1A2, the irradiation state control unit 1A controls the irradiation state of the incident light on the photovoltaic cell C3 to be subjected to determination of the presence or absence of the abnormality in the parallel resistance component to the second irradiation state that is a state in which the short-circuit current of the photovoltaic cell C3 is greater than that in the first irradiation state. For example, the irradiation state control unit 1A sets the irradiation state of the incident light on the photovoltaic cell C3 to the second irradiation state by irradiating the light-receiving surface of the photovoltaic cell C3 with the modulated light ML and the light different from solar light (for example, LED irradiation light).

Next, in step S11B, in a state in which the irradiation state of the incident light on the photovoltaic cell C3 to be subjected to determination of the presence or absence of the abnormality in the parallel resistance component is controlled to the second irradiation state by the irradiation state control unit 1A (for example, in a state in which the light-receiving surface of the photovoltaic cell C3 is irradiated with LED irradiation light), the modulated light irradiation unit 11 irradiates the light-receiving surface of the photovoltaic cell C3 with the modulated light ML.

Next, in step S12B, the phase detection unit 12 detects a minute change in the output current of the photovoltaic module M accompanying the irradiation of the modulated light ML to the photovoltaic cell C3 in the second irradiation state. Furthermore, the phase detection unit 12 outputs the detection result as the phase detection unit output in the second irradiation state.

Next, in step S1B12, the phase detection unit output acquisition unit 1B1 acquires the phase detection unit output (the output of the lock-in amplifier 12a) in the second irradiation state output by the phase detection unit 12 in step S12B.

Next, in step S1B2, the ratio calculation unit 1B2 calculates a ratio of the phase detection unit output (the output of the lock-in amplifier 12a) in the first irradiation state which is acquired in step S1B11 to the phase detection unit output (the output of the lock-in amplifier 12a) in the second irradiation state which is acquired in step S1B12.

Next, in step S1B3, the comparison unit 1B3 compares the threshold value set in advance with the ratio of the phase detection unit output (output of the lock-in amplifier 12a) in the first irradiation state, which is calculated in step S1B2, to the phase detection unit output (output of the lock-in amplifier 12a) in the second irradiation state.

When the ratio of the phase detection unit output (output of the lock-in amplifier 12a) in the first irradiation state to the phase detection unit output (output of the lock-in amplifier 12a) in the second irradiation state is equal to or greater than the threshold value set in advance, the determination unit 1B determines that the photovoltaic cell C3 to be subjected to determination does not have the abnormality in the parallel resistance component. When the ratio of the phase detection unit output (output of the lock-in amplifier 12a) in the first irradiation state to the phase detection unit output (output of the lock-in amplifier 12a) in the second irradiation state is less than the threshold value set in advance, the determination unit 1B determines that the photovoltaic cell C3 to be subjected to determination has the abnormality in the parallel resistance component.

As described above, according to the abnormality determination system 1 for the photovoltaic module M of the first embodiment, it is possible to determine the presence or absence of abnormality in the parallel resistance components of the photovoltaic cells C1, C2, C3, C4, and C5 connected in series in the photovoltaic module M.

Second Embodiment

A second embodiment of an abnormality determination system for a photovoltaic module and an abnormality determination method for a photovoltaic module of the present invention will be described below.

The abnormality determination system 1 for the photovoltaic module M of the second embodiment is constituted in the same manner as the abnormality determination system 1 for the photovoltaic module M of the first embodiment described above, except as described later. Therefore, according to the abnormality determination system 1 for the photovoltaic module M of the second embodiment, the same effects as in the abnormality determination system 1 for the photovoltaic module M of the first embodiment described above can be obtained, except as described later.

As described above, in the abnormality determination system 1 for the photovoltaic module M of the first embodiment, the irradiation state control unit 1A sets the irradiation state of the incident light on the photovoltaic cell C3 to the first irradiation state by, for example, arranging the mask on a part of the light-receiving surface of the photovoltaic cell (for example, the photovoltaic cell C3) to be subjected to determination of the presence or absence of the abnormality in the parallel resistance component (that is, by applying the mask light shading). That is, in the abnormality determination system 1 for the photovoltaic module M of the first embodiment, the first irradiation state is a state in which the control is performed to reduce the incident light applied to the photovoltaic cell C3 to be subjected to determination of the presence or absence of the abnormality in the parallel resistance component.

Further, in the abnormality determination system 1 for the photovoltaic module M of the first embodiment, the irradiation state control unit 1A sets the irradiation state of the incident light on the photovoltaic cell C3 to the second irradiation state by irradiating the light-receiving surface of the photovoltaic cell C3 with light other than solar light (for example, LED irradiation light) (that is, by applying light brightening). That is, in the abnormality determination system 1 for the photovoltaic module M of the first embodiment, the second irradiation state is a state in which the control is performed to increase the incident light applied to the photovoltaic cell C3 to be subjected to determination of the presence or absence of the abnormality in the parallel resistance component.

On the other hand, in the abnormality determination system 1 for the photovoltaic module M of the second embodiment, the first irradiation state is a state in which neither the control to reduce the incident light applied to the photovoltaic cell (for example, the photovoltaic cell C3) to be subjected to determination of the presence or absence of the abnormality in the parallel resistance component nor the control to increase the incident light applied to the photovoltaic cell C3 to be subjected to determination of the presence or absence of the abnormality in the parallel resistance component is performed.

Further, in the abnormality determination system 1 for the photovoltaic module M of the second embodiment, as in the abnormality determination system 1 for the photovoltaic module M of the first embodiment, the second irradiation state is a state in which control is performed to increase the incident light applied to the photovoltaic cell C3 to be subjected to determination of the presence or absence of the abnormality in the parallel resistance component.

Third Embodiment

A third embodiment of an abnormality determination system for a photovoltaic module and an abnormality determination method for a photovoltaic module of the present invention will be described below.

The abnormality determination system 1 for the photovoltaic module M of the third embodiment is constituted in the same manner as the abnormality determination system 1 for the photovoltaic module M of the first embodiment described above, except as described later. Therefore, according to the abnormality determination system 1 for the photovoltaic module M of the third embodiment, the same effects as in the abnormality determination system 1 for the photovoltaic module M of the first embodiment described above can be obtained, except as described later.

In the abnormality determination system 1 for the photovoltaic module M of the third embodiment, as in the abnormality determination system 1 for the photovoltaic module M of the first embodiment, the first irradiation state is a state in which control is performed to reduce the incident light applied to the photovoltaic cells (for example, photovoltaic cell C3) to be subjected to determination of the presence or absence of the abnormality in the parallel resistance component. For example, the irradiation state control unit 1A sets the irradiation state of the incident light on the photovoltaic cell C3 to the first irradiation state by arranging the mask at a part of the light-receiving surface of the photovoltaic cell C3 to be subjected to determination of the presence or absence of the abnormality in the parallel resistance component (that is, by applying the mask light shading).

As described above, in the abnormality determination system 1 for the photovoltaic module M of the first embodiment, the irradiation state control unit 1A sets the irradiation state of the incident light on the photovoltaic cell C3 to the second irradiation state by irradiating the light-receiving surface of the photovoltaic cell C3 with light other than solar light (for example, LED irradiation light) (that is, by applying light brightening). That is, in the abnormality determination system 1 for the photovoltaic module M of the first embodiment, the second irradiation state is a state in which the control is performed to increase the incident light applied to the photovoltaic cell C3 to be subjected to determination of the presence or absence of the abnormality in the parallel resistance component.

On the other hand, in the abnormality determination system 1 for the photovoltaic module M of the third embodiment, the second irradiation state is a state in which neither the control to reduce the incident light applied to the photovoltaic cell (for example, the photovoltaic cell C3) to be subjected to determination of the presence or absence of the abnormality in the parallel resistance component nor the control to increase the incident light applied to the photovoltaic cell C3 to be subjected to determination of the presence or absence of the abnormality in the parallel resistance component is performed.

EXAMPLES

Hereinafter, although the present invention will be described in detail with reference to examples, the present invention is not limited to the examples, and the present invention can be appropriately modified and realized without departing from the scope thereof.

Figure 9:
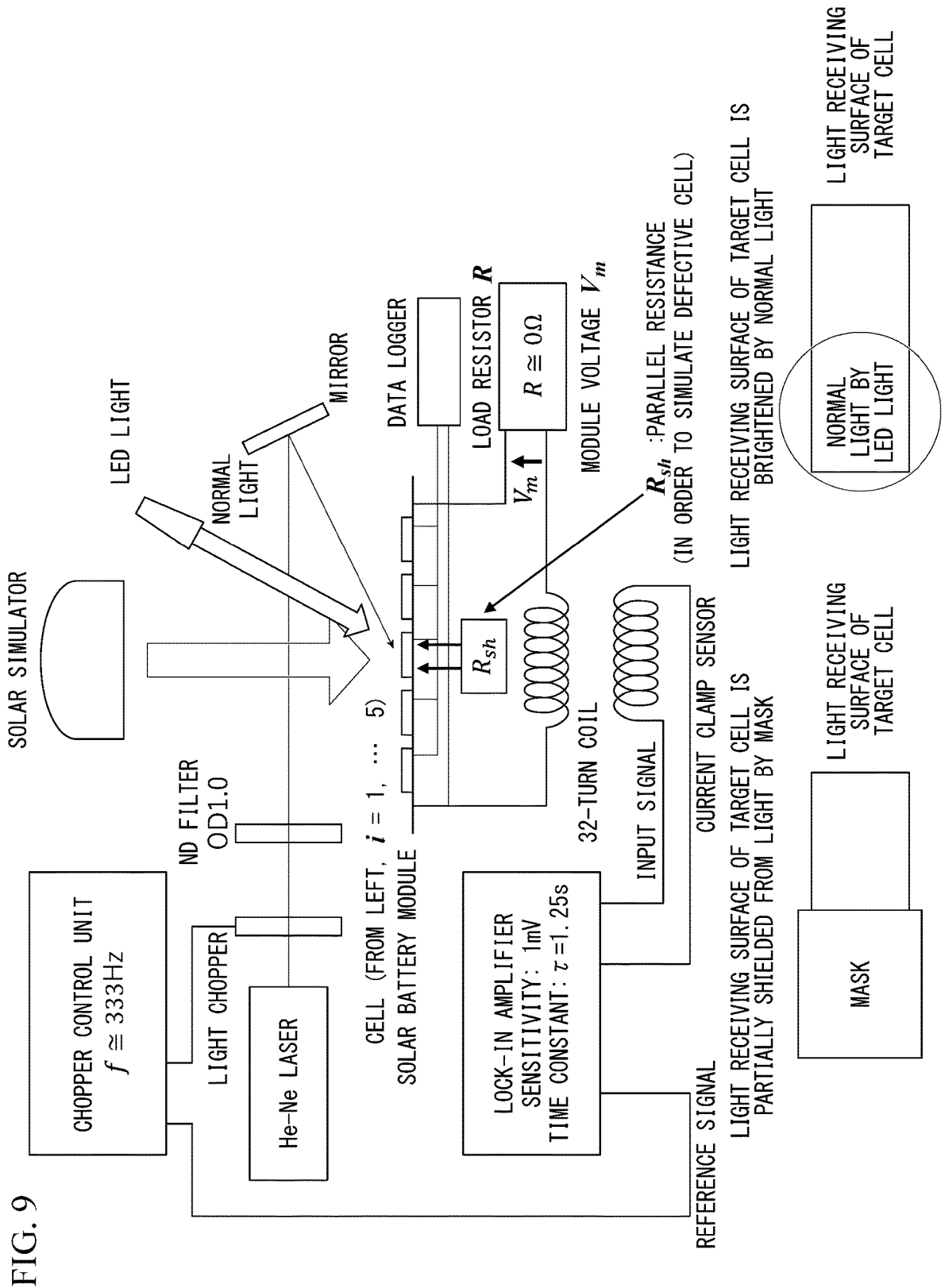
FIG. 9 is a diagram showing a configuration of an experimental apparatus of an example.

FIG. 9 is a diagram showing a configuration of the experimental apparatus of an example.

The experiment of the example was performed using the experimental apparatus shown in FIG. 9. Details are listed below.

Solar simulator: LED lights driven by 50 Hz AC power (Sunway SW-GL100ED56W×2, SW-GL050ED48W× 2, SW-GL030ED35W×4)

Photovoltaic module: Five equivalent polycrystalline Si cells that can be regarded as normal (made in China, cell size 16 mm×63 mm, short-circuit current 250 mA under standard conditions, open circuit voltage 0.6 V, FF about 0.65) were connected in series.

The load resistor R of the photovoltaic module≈0Ω

When simulating cell 2 or cell 3 in the photovoltaic module as a defective cell, resistor $R_{sh}$≈40Ω was connected in parallel. It was confirmed in a preliminary experiment that a defective cell caused by a moderate PID phenomenon can be simulated by connecting the resistor $R_{sh}$.

A 32-turn coil was connected with the photovoltaic module and the load resistor R in series.

Current clamp sensor: manufactured by HIOKI E.E. Corporation, model number 9675, output voltage 0.1 V/A
2-phase lock-in amplifier: LI-575 manufactured by NF CORPORATION. The sensitivity was 1 mV and the time constant was τ=1.25 s
Modulated light source: He—Ne laser (JDSU NOVETTE, oscillation wavelength 633 nm, and random polarization 0.5 mW). An optical chopper (manufactured by NF CORPORATION, Model No. 5584A) of 330 Hz was used for modulation at a duty ratio of 50%, and an absorption ND filter (optical density 1.0) was used to adjust the modulated light intensity.
A data logger (Keyence NR-600 and analog measurement unit NR-HA08 manufactured by KEYENCE Corporation) was used for simultaneous recording of the lock-in amplifier output and the actual cell voltage. The experimental results were analyzed with the time average value of each value recorded with a sampling period of 0.1 ms and a measurement time of 5 s.

Example 1

Table 1 shows the actual cell voltage and the lock-in amplifier output when the mask dimming and the light brightening were applied to cell 2, which had a low voltage (−0.596 V), among normal cells without parallel resistance in a module without the mask dimming and the light brightening. Table 1 shows the effect of the mask dimming and the light brightening with respect to normal cells with low voltage in the module. The voltage of the normal cell 2 without parallel resistance dropped to −1.863 V by the mask dimming and increased to 0.373 V by the light brightening. This corresponds to the behavior described in FIG. 5. For the lock-in amplifier output of the normal cell 2 without parallel resistance, a ratio of output value between the mask dimming and the light brightening was as high as 4.44.

TABLE 1

| Parallel Resistance | Laser Irradiation | To Laser Irradiation Cell | | Average Value (V) of Actual Cell Voltage | | | | | Lock-in Amplifier | Ratio of Lock-in Amplifier Output Value When Laser Irradiation Cell 2 Is |
|---|---|---|---|---|---|---|---|---|---|---|
| (40Ω) | Cell | Mask | Light | Cell 1 | Cell 2 | Cell 3 | Cell 4 | Cell 5 | Output (a.u.) | Irradiated with Light |
| Absence | Cell 2 | Absence | Absence | −0.390 | −0.596 | 0.341 | 0.349 | 0.382 | 0.217 | 2.58 <−ratio of non-processing/light |
| Absence | Cell 2 | Presence | Absence | 0.477 | −1.863 | 0.464 | 0.488 | 0.482 | 0.373 | 4.44 <−ratio of mask/light |
| Absence | Cell 2 | Absence | Presence | −1.311 | 0.373 | 0.333 | 0.325 | 0.368 | 0.084 | 1.00 <−ratio of light/light |

Next, cell 2, which is normal in Table 1, was used as a defective simulation cell by attaching a parallel resistance of 40Ω. Table 2 shows the actual cell voltage and the lock-in amplifier output when the mask dimming and the light brightening were applied to the defective simulation cell 2. Table 2 shows the effect of the mask dimming and the light brightening with respect to defective simulation cells with low voltage in the module. The voltage of the defective simulation cell 2 with a parallel resistance of 40Ω decreased to −0.938 V by the mask dimming and increases to 0.116 V by the light brightening, but the change was small compared to Table 1. This corresponds to the behavior described in FIG. 6. For the lock-in amplifier output of the defective simulation cell 2 with a parallel resistance of 40Ω, the ratio of the output value between the mask dimming and the light brightening was as low as 1.73.

TABLE 2

| Parallel Resistance | Laser Irradiation | To Laser Irradiation Cell | | Average Value (V) of Actual Cell Voltage | | | | | Lock-in Amplifier | Ratio of Lock-in Amplifier Output Value When Laser Irradiation Cell 2 Is |
|---|---|---|---|---|---|---|---|---|---|---|
| (40Ω) | Cell | Mask | Light | Cell 1 | Cell 2 | Cell 3 | Cell 4 | Cell 5 | Output (a.u.) | Irradiated with Light |
| Cell 2 | Cell 2 | Absence | Absence | −0.918 | −0.028 | 0.319 | 0.339 | 0.375 | 0.059 | 1.07 <−ratio of non-processing/light |
| Cell 2 | Cell 2 | Presence | Absence | −0.069 | −0.938 | 0.338 | 0.364 | 0.390 | 0.096 | 1.73 <−ratio of mask/light |
| Cell 2 | Cell 2 | Absence | Presence | −1.053 | 0.116 | 0.317 | 0.335 | 0.371 | 0.056 | 1.00 <−ratio of light/light |

This means that, regarding the value of the ratio of the lock-in amplifier output value for the mask dimming and the light brightening for the cell to be irradiated with the modulated light, it is possible to estimate the quality of the parallel resistance component of the cell to be irradiated, by using the fact that the higher the parallel resistance component of the cell to be irradiated with the modulated light, the higher the ratio value, and, in contrast, the lower the parallel resistance component, the closer the value of the ratio to 1.

Example 2

Furthermore, a parallel resistance of 40Ω was attached to cell 3 adjacent to cell 2, and cell 3 was used as a defective simulation cell. Although cell 2 without parallel resistance remained normal, whether or not the quality of the parallel resistance component of the normal cell 2 can be estimated even when the adjacent cell 3 was defective was examined and summarized in Table 3. Table 3 shows the effect of the mask dimming and the light brightening with respect to the normal cells with low voltage when adjacent cells were defective. The voltage of the normal cell 2 dropped to −1.802 V by the mask dimming and increased to 0.369 V by the light brightening. For the lock-in amplifier output of the normal cell 2, the ratio of the output value between the mask dimming and the light brightening was as high as 6.18. In other words, even though the adjacent cell was defective, it means that the quality of the parallel resistance component of the cell to be irradiated with the modulated light can be estimated.

TABLE 3

| Parallel Resistance (40Ω) | Laser Irradiation Cell | To Laser Irradiation Cell | | Average Value (V) of Actual Cell Voltage | | | | | Lock-in Amplifier Output (a.u.) | Ratio of Lock-in Amplifier Output Value When Laser Irradiation Cell 2 Is Irradiated with Light |
|---|---|---|---|---|---|---|---|---|---|---|
| | | Mask | Light | Cell 1 | Cell 2 | Cell 3 | Cell 4 | Cell 5 | | |
| Cell 3 | Cell 2 | Absence | Absence | −0.214 | −0.538 | 0.111 | 0.349 | 0.380 | 0.244 | 4.13 <−ratio of non-processing/light |
| Cell 3 | Cell 2 | Presence | Absence | 0.475 | −1.802 | 0.410 | 0.484 | 0.479 | 0.366 | 6.18 <−ratio of mask/light |
| Cell 3 | Cell 2 | Absence | Presence | −1.082 | 0.369 | 0.098 | 0.332 | 0.369 | 0.059 | 1.00 <−ratio of light/light |

Example 3

Table 4 shows the actual cell voltage and the lock-in amplifier output when the mask dimming and the light brightening were applied to cell 3, which had a high voltage (0.349 V), among normal cells without parallel resistance in a module without the mask dimming and the light brightening. Table 4 shows the effect of the mask dimming and the light brightening with respect to normal cells with high voltage in the module. The normal cell 3 voltage without parallel resistance dropped to −1.864 V by the mask dimming and increased to 0.390 V by the light brightening. This corresponds to the behavior described in FIG. 5. For the lock-in amplifier output of the normal cell 3 without parallel resistance, the ratio of the output value between the mask dimming and the light brightening was as high as 7.93.

TABLE 4

| Parallel Resistance (40Ω) | Laser Irradiation Cell | To Laser Irradiation Cell | | Average Value (V) of Actual Cell Voltage | | | | | Lock-in Amplifier Output (a.u.) | Ratio of Lock-in Amplifier Output Value When Laser Irradiation Cell 2 Is Irradiated with Light |
|---|---|---|---|---|---|---|---|---|---|---|
| | | Mask | Light | Cell 1 | Cell 2 | Cell 3 | Cell 4 | Cell 5 | | |
| Absence | Cell 3 | Absence | Absence | −0.453 | −0.535 | 0.349 | 0.347 | 0.378 | 0.057 | 1.24 <−ratio of non-processing/light |
| Absence | Cell 3 | Presence | Absence | 0.473 | 0.477 | −1.864 | 0.483 | 0.478 | 0.363 | 7.93 <−ratio of mask/light |
| Absence | Cell 3 | Absence | Presence | −0.619 | −0.407 | 0.390 | 0.346 | 0.376 | 0.046 | 1.00 <−ratio of light/light |

Next, cell 3, which is normal in Table 4, was used as a defective simulation cell by attaching a parallel resistance of 40Ω. Table 5 shows the actual cell voltage and the lock-in amplifier output when the mask dimming and the light brightening were applied to the defective simulation cell 3. Table 5 shows the effect of the mask dimming and the light brightening with respect to defective simulation cells with high voltage in the module. The voltage of the defective simulation cell 3 with a parallel resistance of 40Ω decreased to −0.884 V by the mask dimming and increased to 0.231 V by the light brightening, but the change was small compared to Table 4. This corresponds to the behavior described in FIG. 6. For the lock-in amplifier output of the defective simulation cell 3 with a parallel resistance of 40Ω, the ratio of the output value between the mask dimming and the light brightening was as low as 1.47.

TABLE 5

| Parallel Resistance | Laser Irradiation | To Laser Irradiation Cell | | Average Value (V) of Actual Cell Voltage | | | | | Lock-in Amplifier | Ratio of Lock-in Amplifier Output Value When Laser Irradiation Cell 2 Is |
|---|---|---|---|---|---|---|---|---|---|---|
| (40Ω) | Cell | Mask | Light | Cell 1 | Cell 2 | Cell 3 | Cell 4 | Cell 5 | Output (a.u.) | Irradiated with Light |
| Cell 3 | Cell 3 | Absence | Absence | −0.394 | −0.343 | 0.100 | 0.346 | 0.377 | 0.053 | 1.00 <—ratio of non-processing/light |
| Cell 3 | Cell 3 | Presence | Absence | −0.015 | 0.233 | −0.884 | 0.363 | 0.387 | 0.077 | 1.47 <—ratio of mask/light |
| Cell 3 | Cell 3 | Absence | Presence | −0.512 | −0.356 | 0.231 | 0.346 | 0.376 | 0.053 | 1.00 <—ratio of light/light |

This means that, in a case where the result was combined with Example 1, regardless of the cell voltage in the normal state, regarding the value of the ratio of the lock-in amplifier output value for the mask dimming and the light brightening for the cell to be irradiated with the modulated light, it was possible to estimate the quality of the parallel resistance component of the cell to be irradiated with the modulated light, by using the fact that the higher the parallel resistance component of the cell to be irradiated with the modulated light, the higher the ratio value, and, in contrast, the lower the parallel resistance component, the closer the value of the ratio to 1.

Example 4

Furthermore, a parallel resistance of 40Ω was attached to cell 2 adjacent to cell 3, and cell 2 was used as a defective simulation cell. Although the cell 3 without parallel resistance remained normal, whether or not the quality of the parallel resistance component of the normal cell 3 can be estimated even when the adjacent cell 2 was defective was examined and summarized in Table 6. Table 6 shows the effect of the mask dimming and the light brightening with respect to the normal cells with high voltage when adjacent cells were defective. The voltage of the normal cell 2 dropped to −1.799 V by the mask dimming and increased to 0.380 V by the light brightening. For the lock-in amplifier output of normal cell 3, the ratio of the output value between the mask dimming and the light brightening was as high as 5.70.

TABLE 6

| Parallel Resistance | Laser Irradiation | To Laser Irradiation Cell | | Average Value (V) of Actual Cell Voltage | | | | | Lock-in Amplifier | Ratio of Lock-in Amplifier Output Value When Laser Irradiation Cell 2 Is |
|---|---|---|---|---|---|---|---|---|---|---|
| (40Ω) | Cell | Mask | Light | Cell 1 | Cell 2 | Cell 3 | Cell 4 | Cell 5 | Output (a.u.) | Irradiated with Light |
| Cell 2 | Cell 3 | Absence | Absence | −0.952 | −0.016 | 0.340 | 0.341 | 0.374 | 0.057 | 0.91 <—ratio of non-processing/light |
| Cell 2 | Cell 3 | Presence | Absence | 0.471 | 0.416 | −1.799 | 0.483 | 0.478 | 0.356 | 5.70 <—ratio of mask/light |
| Cell 2 | Cell 3 | Absence | Presence | −0.992 | −0.014 | 0.380 | 0.341 | 0.373 | 0.062 | 1.00 <—ratio of light/light |

In a case where the result was combined with Example 2, regardless of the cell voltage in the normal state, even though the adjacent cell was defective, it means that the quality of the parallel resistance component of the cell to be irradiated with the modulated light can be estimated.

Hereinabove, although the embodiments of the present invention are described in detail with reference to the drawings, a specific configuration is not limited to the embodiments and can be appropriately modified without departing from the gist of the present invention. The configurations described in each of the embodiments and each of the examples described above may be combined.

Note that, all or a part of the abnormality determination system 1 for the photovoltaic module M of the above-described embodiment may be realized by dedicated hardware, or may be realized by a memory and a microprocessor.

Note that, all or a part of the abnormality determination system 1 for the photovoltaic module M may be composed of a memory and a Central Processing Unit (CPU), and realizes a function thereof by loading and executing a program for realizing the function of each of the units included in each system in the memory.

Note that, a process of each unit may be performed by recording a program for realizing all or a part of the functions of the abnormality determination system 1 for the photovoltaic module M on a computer-readable recording medium, and reading and executing the program recorded on the recording medium in the computer system. Note that, here, the "computer system" includes an OS and hardware such as a peripheral device. Further, the "computer system" includes a homepage-providing environment (or a display environment) in a case where a WWW system is used.

In addition, the "computer-readable recording medium" refers to a portable medium, such as a flexible disk, a magneto-optical disk, a ROM, and a CD-ROM, and a storage device such as a hard disk built in the computer system. Further, the "computer-readable recording medium" includes a medium which dynamically holds a program for a short time like a communication line in a case of transmitting the program through a network such as the Internet or a communication line such as a telephone line, and a medium which holds a program for a certain period of time like a volatile memory in the computer system serving as a server or a client in the case. In addition, the program may be provided to realize a part of the above-described functions, or may be realized by combining the above-described functions with a program already recorded in the computer system.

REFERENCE SIGNS LIST

1: Abnormality determination system
11: Modulated light irradiation unit
111: Laser light irradiation unit
112: Light chopper unit
113: Chopper control unit
114: Reflector
115: Filter
12: Phase detection unit
12a: Lock-in amplifier
13: AC current clamp sensor
1A: Irradiation state control unit
1B: Determination unit
1B1: Phase detection unit output acquisition unit
1B2: Ratio calculation unit
1B3: Comparison unit
M: Photovoltaic module
C1, C2, C3, C4, C5: Photovoltaic cell
RL: Load resistor

What is claimed is:

1. An abnormality determination system for a photovoltaic module that determines a presence or absence of an abnormality in each of a plurality of photovoltaic cells constituting the photovoltaic module and connected in series, the abnormality determination system comprising:
    an irradiation state control unit configured to control an irradiation state of incident light on a photovoltaic cell to be subjected to determination between at least a first irradiation state and a second irradiation state in which a short-circuit current of the photovoltaic cell to be subjected to determination is larger than a short-circuit current of the photovoltaic cell to be subjected to determination in the first irradiation state;
    a modulated light irradiation unit configured to irradiate the photovoltaic cell to be subjected to determination with modulated light different from the incident light;
    a phase detection unit configured to detect a minute change in an output current of the photovoltaic module in accordance with an irradiation of the photovoltaic cell to be subjected to determination with the modulated light, and output a detection result as a phase detection unit output;
    a ratio calculation unit configured to calculate a ratio between a phase detection unit output in the first irradiation state and a phase detection unit output in the second irradiation state; and
    a comparison unit configured to compare the ratio calculated by the ratio calculation unit with a threshold value set in advance.

2. The abnormality determination system for photovoltaic module according to claim 1, wherein
    the first irradiation state is a state in which control is performed to reduce the incident light applied to the photovoltaic cell to be subjected to determination, and
    the second irradiation state is a state in which control is performed to increase the incident light applied to the photovoltaic cell to be subjected to determination.

3. The abnormality determination system for the photovoltaic module according to claim 1, wherein
    the first irradiation state is a state in which neither control to reduce the photovoltaic cell to be subjected to determination nor control to increase the incident light applied to the photovoltaic cell to be subjected to determination is performed, and
    the second irradiation state is a state in which control to increase the incident light applied to the photovoltaic cell to be subjected to determination is performed.

4. The abnormality determination system for the photovoltaic module according to claim 1, wherein
    the first irradiation state is a state in which control is performed to reduce the incident light applied to the photovoltaic cell to be subjected to determination, and
    the second irradiation state is a state in which neither control to reduce the incident light applied to the photovoltaic cell to be subjected to determination nor control to increase the incident light applied to the photovoltaic cell to be subjected to determination is performed.

5. An abnormality determination method for a photovoltaic module that determines a presence or absence of an abnormality in each of a plurality of photovoltaic cells constituting the photovoltaic module and connected in series, the abnormality determination method comprising:

an irradiation state control step of controlling an irradiation state of incident light on a photovoltaic cell to be subjected to determination between at least a first irradiation state and a second irradiation state in which a short-circuit current of the photovoltaic cell to be subjected to determination is larger than a short-circuit current of the photovoltaic cell to be subjected to determination in the first irradiation state;

a modulated light irradiation step of irradiating the photovoltaic cell to be subjected to determination with modulated light different from the incident light;

a phase detection step of detecting a minute change in an output current of the photovoltaic module in accordance with an irradiation of the photovoltaic cell to be subjected to determination with the modulated light, and outputting a detection result as a phase detection unit output;

a ratio calculation step of calculating a ratio between a phase detection unit output in the first irradiation state and a phase detection unit output in the second irradiation state; and a comparison step of comparing the ratio calculated in the ratio calculation step with a threshold value set in advance.

6. The abnormality determination method for the photovoltaic module according to claim 5, wherein the modulated light irradiation step includes a first irradiation state modulated light irradiation step of irradiating the photovoltaic cell to be subjected to determination with the modulated light when being controlled to the first irradiation state, and a second irradiation state modulated light irradiation step of irradiating the photovoltaic cell to be subjected to determination with the modulated light when being controlled to the second irradiation state, and the phase detection step includes a first irradiation state phase detection step of outputting a detection result of a minute change in the output current of the photovoltaic module in accordance with the irradiation of the photovoltaic cell to be subjected to determination with the modulated light when being controlled to the first irradiation state, as a phase detection unit output in the first irradiation state, and a second irradiation state phase detection step of outputting a detection result of a minute change in the output current of the photovoltaic module in accordance with the irradiation of the photovoltaic cell to be subjected to determination with the modulated light when being controlled to the second irradiation state, as a phase detection unit output in the second irradiation state.

* * * * *